United States Patent
Wheatley et al.

(10) Patent No.: US 11,768,145 B2
(45) Date of Patent: Sep. 26, 2023

(54) POROUS FLUID SENSOR

(71) Applicant: 3M INNOVATIVE PROPERTIES COMPANY, St. Paul, MN (US)

(72) Inventors: John A. Wheatley, Stillwater, MN (US); William B. Kolb, Stillwater, MN (US); Audrey A. Sherman, Woodbury, MN (US); Mark A Roehrig, Stillwater, MN (US); Alan R. Dombrowski, Woodbury, MN (US); Kurt J. Halverson, Lake Elmo, MN (US); Steven P. Swanson, Blaine, MN (US); Del R. Lawson, Cottage Grove, MN (US); Cory M. Arthur, Eagan, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 33 days.

(21) Appl. No.: 17/628,735

(22) PCT Filed: Jul. 24, 2020

(86) PCT No.: PCT/IB2020/057023
§ 371 (c)(1),
(2) Date: Jan. 20, 2022

(87) PCT Pub. No.: WO2021/019404
PCT Pub. Date: Feb. 4, 2021

(65) Prior Publication Data
US 2022/0268685 A1 Aug. 25, 2022

Related U.S. Application Data

(60) Provisional application No. 62/878,983, filed on Jul. 26, 2019.

(51) Int. Cl.
*G01N 15/08* (2006.01)
*G01N 21/78* (2006.01)
*G01N 21/81* (2006.01)

(52) U.S. Cl.
CPC ..... *G01N 15/0806* (2013.01); *G01N 15/0826* (2013.01)

(58) Field of Classification Search
CPC .... G01N 15/00; G01N 15/08; G01N 15/0806; G01N 15/0826; G01N 21/29;
(Continued)

(56) References Cited

U.S. PATENT DOCUMENTS 8,964,146 B2 2/2015 Hao
9,234,834 B2 * 1/2016 Van Mechelen ....... G01N 21/17
(Continued)

FOREIGN PATENT DOCUMENTS

DE 102015015877 6/2017
JP 61217744 A * 9/1986 ............. G01N 21/81
(Continued)

OTHER PUBLICATIONS

International Search report for PCT International Application No. PCT/IB2020/057023 dated Feb. 12, 2020, 9 pages.

*Primary Examiner* — Nguyen Q. Ha

(57) ABSTRACT

An optical element includes a porous layer with a network of a plurality of interconnected voids. The porous layer is optically diffusive to at least one wavelength of light when the network of interconnected voids is substantially free of fluid. The porous layer of the optical element undergoes a detectable optical change upon fluid ingress into the network or egress from the network of interconnected voids.

16 Claims, 18 Drawing Sheets

(58) Field of Classification Search
CPC ........ G01N 21/75; G01N 21/78; G01N 21/81; G01M 3/00; G01M 3/38
See application file for complete search history.

(56) References Cited

U.S. PATENT DOCUMENTS

| | | | |
|---|---|---|---|
| 9,279,918 B2 | 3/2016 | Haag | |
| 9,442,073 B2 * | 9/2016 | Joly | ................... A41D 13/1161 |
| 9,588,262 B2 | 3/2017 | Coggio | |
| 10,578,559 B2 * | 3/2020 | Silvanto | ............. G01N 21/8803 |
| 2009/0035179 A1 | 2/2009 | Rakow | |
| 2013/0066289 A1 * | 3/2013 | Song | ........................ A61L 15/56 |
| | | | 604/361 |
| 2016/0334551 A1 | 11/2016 | Kolb | |

FOREIGN PATENT DOCUMENTS

| | | | | |
|---|---|---|---|---|
| JP | 62108133 A * | 5/1987 | ............. G01N 21/47 |
| JP | 2005156813 | 6/2005 | |
| KR | 20110056136 A * | 5/2011 | ........... G01N 27/121 |
| WO | WO-2006014410 A1 * | 2/2006 | ........... G01N 21/251 |
| WO | WO-2010055308 A1 * | 5/2010 | ............. G01N 21/78 |
| WO | WO 2010-120422 | 10/2010 | |
| WO | WO 2010-120468 | 10/2010 | |
| WO | WO 2010-120845 | 10/2010 | |
| WO | WO 2010-120864 | 10/2010 | |
| WO | WO 2010-120871 | 10/2010 | |
| WO | WO 2010-121019 | 10/2010 | |
| WO | WO 2010-121054 | 10/2010 | |
| WO | WO 2010-121056 | 10/2010 | |
| WO | WO 2011-050226 | 4/2011 | |
| WO | WO 2011-050228 | 4/2011 | |
| WO | WO 2011-050232 | 4/2011 | |
| WO | WO 2011-050233 | 4/2011 | |
| WO | WO 2011-050236 | 4/2011 | |
| WO | WO 2011-050254 | 4/2011 | |
| WO | WO 2011-050268 | 4/2011 | |
| WO | WO-2011062381 A2 * | 5/2011 | ......... G01N 21/7703 |
| WO | WO 2011-068754 | 6/2011 | |
| WO | WO 2011-071728 | 6/2011 | |
| WO | WO 2011-088161 | 7/2011 | |
| WO | WO 2011-129831 | 10/2011 | |
| WO | WO 2011-129832 | 10/2011 | |
| WO | WO 2011-129833 | 10/2011 | |
| WO | WO 2011-129848 | 10/2011 | |
| WO | WO 2012-054318 | 4/2012 | |
| WO | WO 2016-168147 | 10/2016 | |
| WO | WO-2019034888 A1 * | 2/2019 | ............. G01N 15/08 |

\* cited by examiner

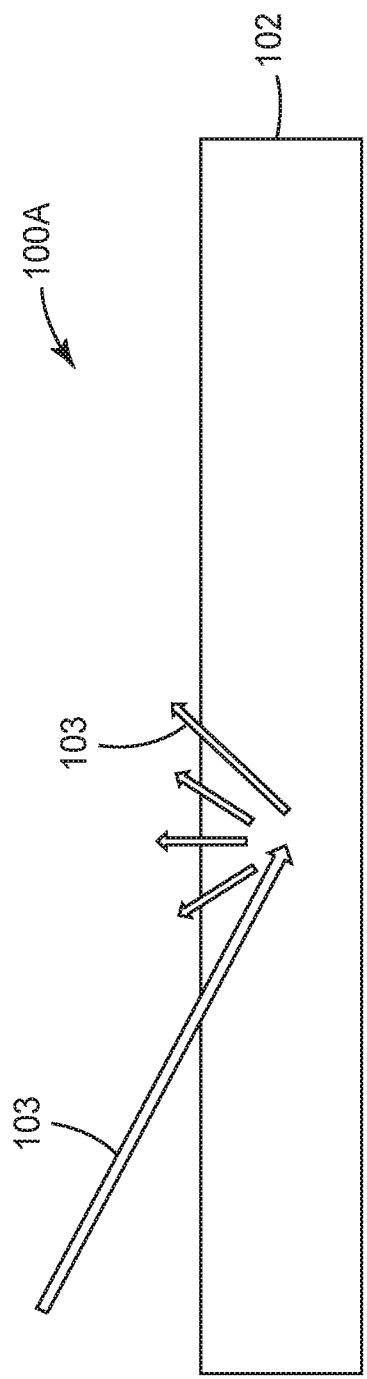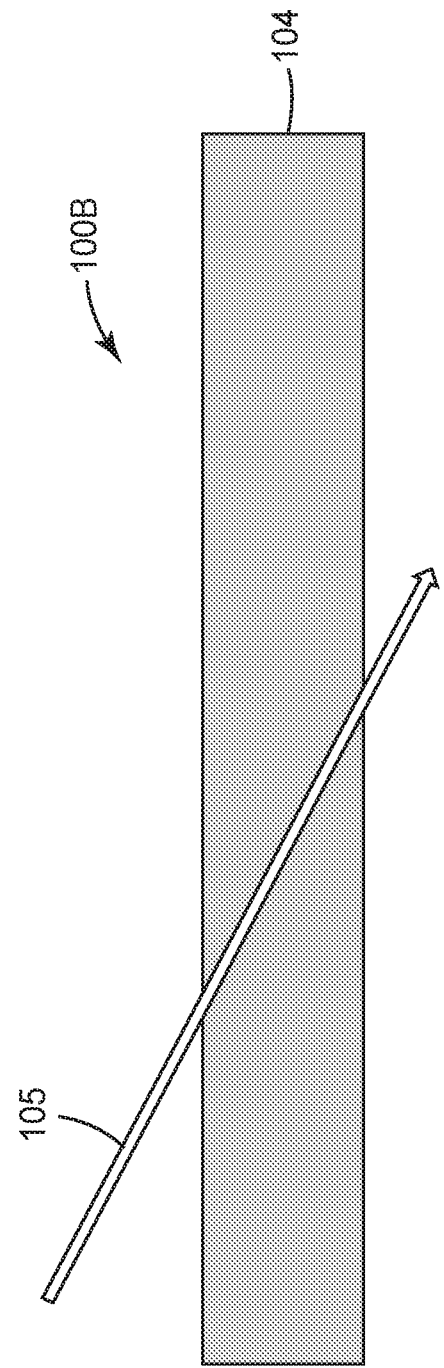

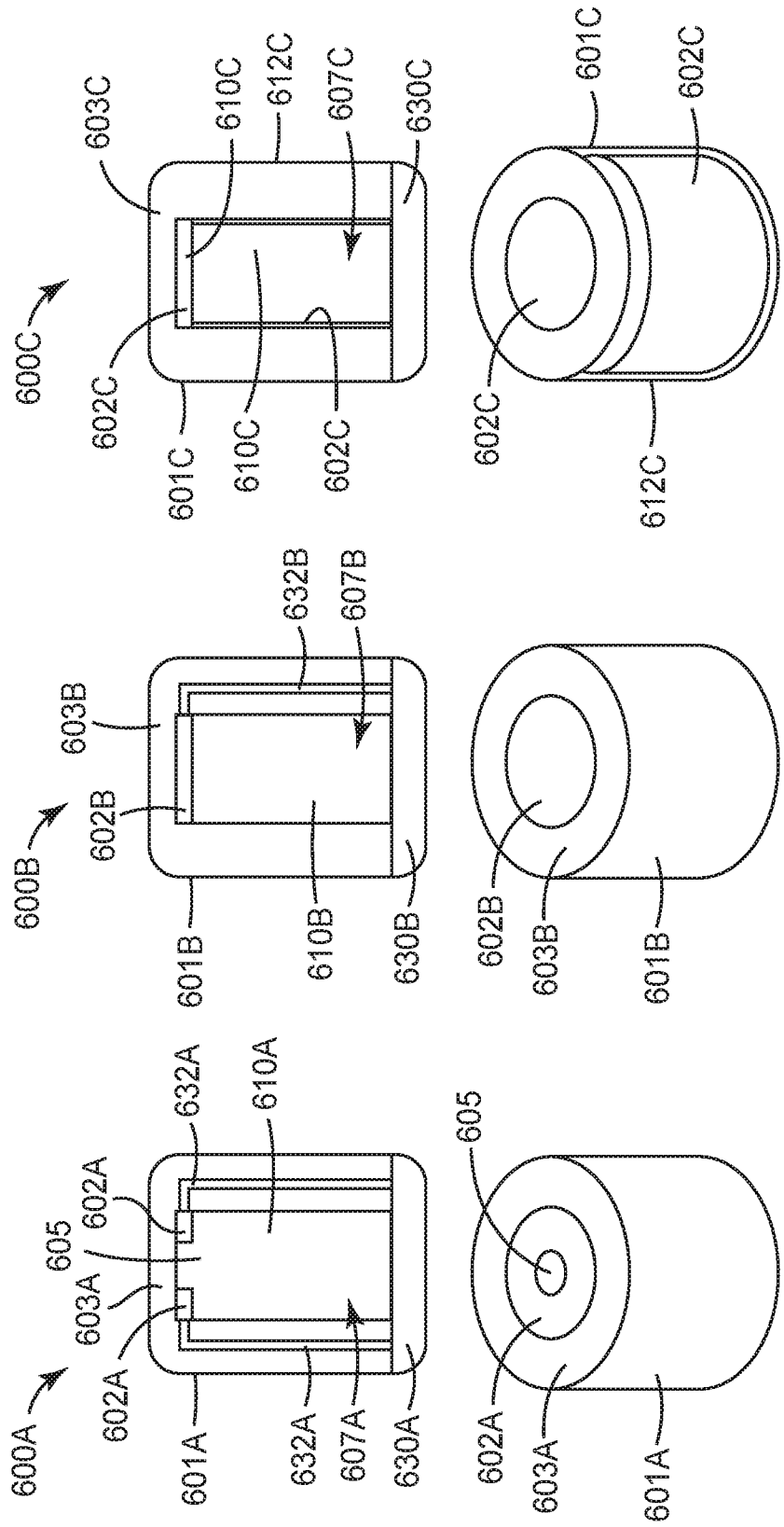

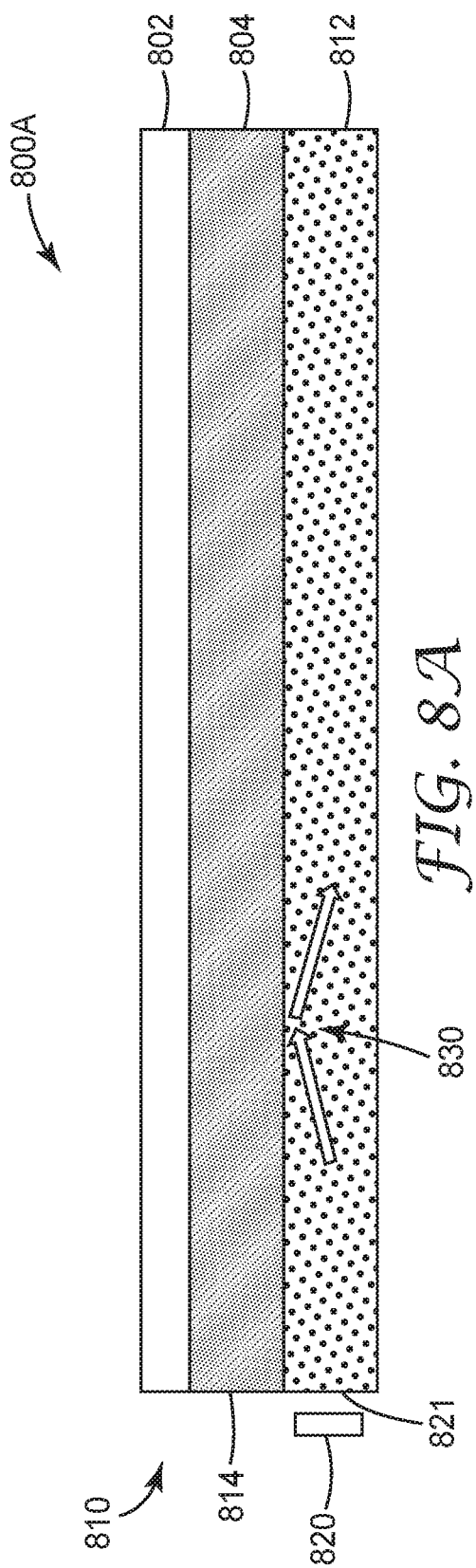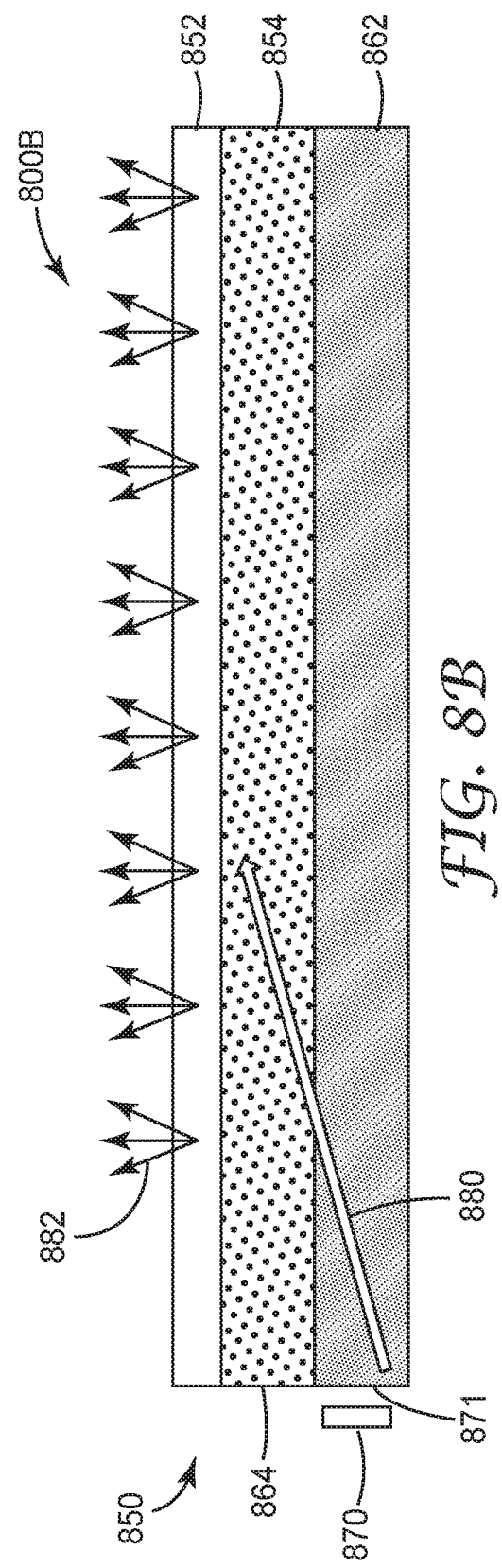

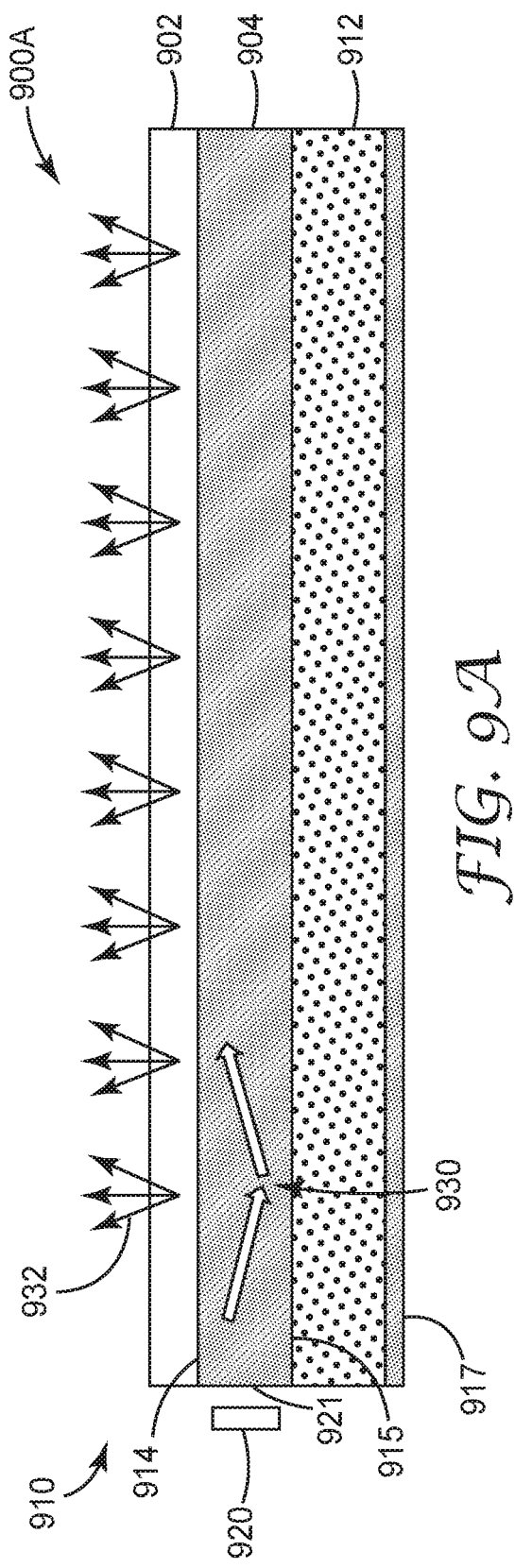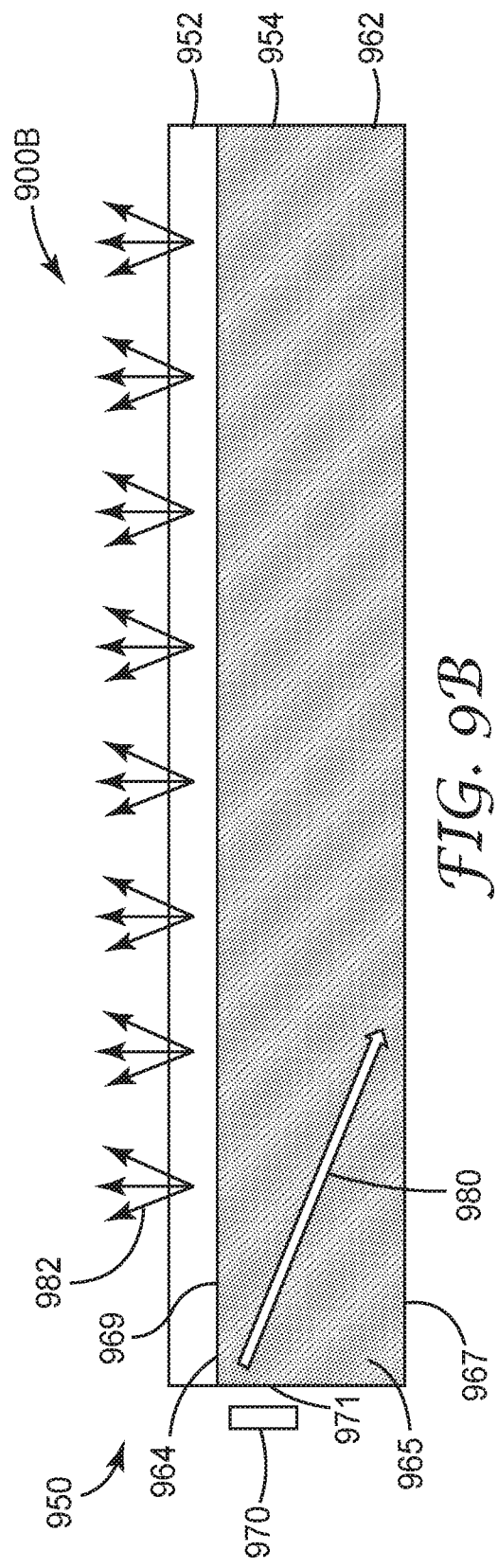

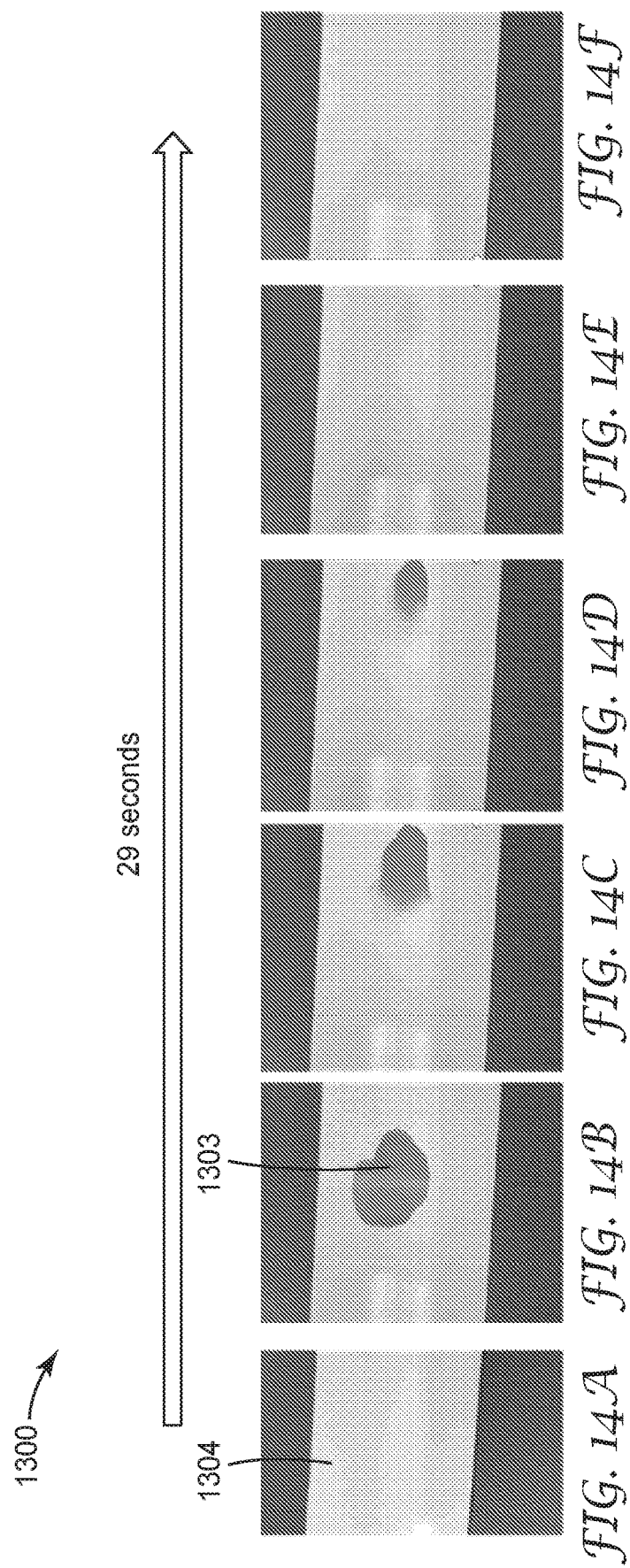

POROUS FLUID SENSOR

CROSS REFERENCE TO RELATED APPLICATIONS

This application is a national stage filing under 35 U.S.C. 371 of PCT/IB2020/057023, filed Jul. 24, 2020, which claims the benefit of US Provisional Patent Application No. 62/878983, filed Jul. 26, 2019, the disclosure of which is incorporated by reference in its/their entirety herein.

BACKGROUND

Detection of the wetness or dryness of a material can be useful in many applications. For example, detection of the presence or absence of a fluid can indicate whether a packaged material is fresh or contaminated, the extent to which a fluid has traversed an arrangement of channels in a microfluidic device, or whether a disinfecting fluid remains present in an enclosure to maintain an antimicrobial effect. However, fluid detection can be time consuming or unreliable, and is difficult to perform without disturbing the material being evaluated. Techniques are needed to create fluid sensors that rapidly and reproducibly assess the presence of a fluid.

Some optical devices require selective control of light transmission at a point along an optical path, or through a surface of an optical component such as, for example, a lightguide. It can be difficult to accurately control light transmission along the surface of an optical component at a reasonably low cost.

SUMMARY

In general, the present disclosure relates to a fluid sensor including a layer of a porous material with a network of interconnected voids. Fluid ingress into or egress from the voids causes a change in the refractive index of the porous material, and the optical effect of this refractive index change can be utilized for fluid sensing. For example, the porous material can be selected from materials with a very low refractive index that are optically diffusive when the voids are substantially free of fluid (dry), and then become transmissive to at least one wavelength of light when the voids contain a fluid (wet). In various embodiments, this change in appearance as the porous material changes from a dry state to a wet state (or vice-versa) can provide a fluid sensor.

In one embodiment, the change in refractive index as the porous material moves between wet and dry states can provide a rapid visual indication of the presence or absence of fluid in a closure member such as, for example, a closure for a medical device, packaging, and the like.

In another embodiment, the change in refractive index as the porous material moves between wet and dry states can be used to control light transmission at an interface between the porous polymeric film and an optical component. In addition, the porous material can be placed at a selected position along an optical path, and the change in appearance of the porous material between wet and dry states can be used to control light transmission along the optical path.

In one aspect, the present disclosure is directed to an optical element that includes a porous layer with a network of a plurality of interconnected voids. The porous layer is optically diffusive to at least one wavelength of light when the network of interconnected voids is substantially free of fluid. The porous layer of the optical element undergoes a detectable optical change upon fluid ingress into the network or egress from the network of interconnected voids.

In another aspect, the present disclosure is directed to an optical element including a porous polymeric film with a network of a plurality of interconnected voids. The porous polymeric film is optically diffusive to at least one wavelength of light when the network of interconnected voids is substantially free of fluid, and wherein the porous polymeric film undergoes a detectable optical change upon fluid ingress into the network, or fluid egress from the network, of interconnected voids. A first polymeric film is on a first major surface of the porous polymeric film; and a second polymeric film different from the first polymeric film, on a second major surface of the porous polymeric film; wherein the first polymeric film is transmissive to visible light and the second polymeric film includes comprises at least one of a pigment, a dye, an indicia, and combinations thereof.

In another aspect, the present disclosure is directed to an optical element including a porous polymeric film with a network of a plurality of interconnected voids, wherein the porous polymeric film is optically diffusive to at least one wavelength of light when the network of interconnected voids is substantially free of fluid, and wherein the porous polymeric film undergoes a detectable optical change upon fluid ingress into the network or egress from the network of interconnected voids. A first interference reflector on a first major surface of the porous polymeric film; and a second interference reflector, which may be the same or different from the first interference reflector, on the second major surface of the porous polymeric film.

In another aspect, the present disclosure is directed to a closure member. The closure member includes a body with a fluid sensor disposed on at least a portion thereof, wherein the fluid sensor comprises a layer of a porous material with a network of interconnected voids, wherein the layer of the porous material is optically diffusive to at least one wavelength of light when the network of interconnected voids is substantially free of fluid, and wherein the layer of the porous material undergoes a detectable optical change and becomes transmissive to the at least one wavelength of light upon fluid ingress into the network or egress from the network of interconnected voids.

In another aspect, the present disclosure is directed to an antimicrobial closure member with a body that is transmissive to at least one wavelength of light over at least a portion thereof. The body includes an interior chamber, and an antimicrobial fluid in the body. A fluid sensor is in the interior chamber, wherein the fluid sensor includes a layer of a porous material. At least one evaporative pathway is between the interior chamber and an exterior of the body. The layer of the porous material is optically diffusive to at least one wavelength of light when the network is substantially free of an antimicrobial liquid, and wherein the fluid sensor undergoes a detectable optical change and becomes transmissive to the at least one wavelength of light upon ingress or egress of an antimicrobial liquid from the fluid sensor.

In another aspect, the present disclosure is directed to an antimicrobial closure member: a body that is transmissive to at least one wavelength of light over at least a portion thereof, wherein the body includes an interior chamber; a fluid sensor in the interior chamber, wherein the fluid sensor includes a porous polymeric film, and wherein at least a portion of the porous polymeric film is filled with an antimicrobial fluid; wherein the porous polymeric film is optically diffusive to at least one wavelength of light when the network is substantially free of the antimicrobial liquid, and wherein the fluid sensor undergoes a detectable optical change and becomes transmissive to the at least one wavelength of light upon egress of the antimicrobial liquid from the fluid sensor.

In another aspect, the present disclosure is directed to a closure device including a body with an interior chamber; a fluid in the interior chamber; a component in the interior chamber of the body, wherein the component includes a fluid sensor with a layer of a porous material; wherein the fluid sensor undergoes a detectable optical change based on the presence of fluid in the interior chamber of the closure device.

In another aspect, the present disclosure is directed to an optical device, including: a lightguide with a first major surface; and an optical switch including a layer of a porous material with a first major surface and a second major surface, wherein the second major surface of the layer of the porous material is on the first major surface of the lightguide, and wherein the porous material has a network of interconnected voids; and wherein the layer of the porous material is optically diffusive to at least one wavelength of light when the network of voids is substantially free of a fluid, and wherein the optical switch undergoes a detectable optical change to become optically transmissive to the at least one wavelength of light upon ingress or egress of the fluid from the network of voids.

In another aspect, the present disclosure is directed to an optical device including a lightguide with a first major surface and a second major surface; a light scattering layer on the first major surface of the lightguide; and an optical switch on the second major surface of the lightguide, wherein the optical switch includes a porous polymeric film with a first major surface and a second major surface, wherein the first major surface of the porous polymeric film is on the second major surface of the lightguide, wherein the porous polymeric film has a network of interconnected voids; and wherein the porous polymeric film is optically diffusive to at least one wavelength of light when the network is substantially free of a fluid, and wherein the optical switch undergoes a detectable optical change upon ingress or egress of the fluid from the network; and a light absorbing layer on the second major surface of the porous polymeric film.

In another aspect, the present disclosure is directed to an optical device including a cylindrical lightguide with a first major surface and a second major surface; and an optical switch including: a layer of a porous material with a first major surface and a second major surface, wherein the first major surface of the layer of the porous material is on an exterior surface the lightguide, wherein the layer of the porous material has a network of interconnected voids; and wherein the layer of the porous material is optically diffusive to at least one wavelength of light when the network of voids is substantially free of a fluid, and wherein the optical switch undergoes a detectable optical change to become optically transmissive to the at least one wavelength of light upon ingress or egress of the fluid from the network of voids; and a light absorbing layer on the second major surface of the layer of the porous material.

In another aspect, the present disclosure is directed to an optical device including a light transmissive component with an optical path; and a layer of a porous material in the optical path, wherein the layer of the porous material has a network of interconnected voids; and wherein the layer of the porous material is optically diffusive to at least one wavelength of light when the network of voids is substantially free of a fluid, and wherein the optical switch undergoes a detectable optical change to become optically transmissive to the at least one wavelength of light upon ingress or egress of the fluid from the network of voids.

In another aspect, the present disclosure is directed to an optical device including a retroreflector; and a layer of a porous material on at least a portion of a major surface of the retroreflector, wherein the layer of the porous material has a network of interconnected voids; and wherein the layer of the porous material is optically diffusive to at least one wavelength of light when the network of voids is substantially free of a fluid, and wherein the optical switch undergoes a detectable optical change to become optically transmissive to the at least one wavelength of light upon ingress or egress of the fluid from the network of voids.

In another aspect, the present disclosure is directed to an optical element, including: a porous polymeric film having a first portion with a network of a plurality of interconnected voids, wherein the first portion of the porous polymeric film is optically diffusive to at least one wavelength of light when the network of interconnected voids is substantially free of fluid, and wherein the first portion of the porous polymeric film undergoes a detectable optical change upon fluid ingress into the network, or fluid egress from the network, of interconnected voids; a filler in a second portion of the porous polymeric film; a first polymeric film on a first major surface of the porous polymeric film; and a second polymeric film different from the first polymeric film, on a second major surface of the porous polymeric film; wherein the first polymeric film is transmissive to visible light and the second polymeric film comprises at least one of a pigment, a dye, an indicia, and combinations thereof.

In another aspect, the present disclosure is directed to a microfluidic device, including: a substrate with a network of microchannels configured to transport a fluid; and a fluid sensor in fluid communication with the network of microchannels, wherein the fluid sensor has a porous polymeric film with a network of a plurality of interconnected voids, wherein the porous polymeric film is optically diffusive to at least one wavelength of light when the network is substantially free of fluid, and wherein the fluid sensor undergoes a detectable optical change upon fluid ingress into the network or egress from the network to become optically transmissive at the at least one wavelength to provide a visual indication of movement of a fluid through the network of channels in the substrate.

In another aspect, the present disclosure is directed to a method, including: selecting a porous polymeric film with a network of plurality of interconnected voids, wherein the porous polymeric film has a first refractive index when the network is substantially free of a fluid, and a second refractive index, different from the first refractive index, when the network includes a predetermined amount of a fluid; introducing a fluid into the network; and detecting an optical change in the porous polymeric film to determine fluid ingress into the network or egress from the network.

In another aspect, the present disclosure is directed to a method, including: applying on a light transmissive surface of an optical device a light switch having a porous polymeric film with a network of plurality of interconnected voids, wherein the porous polymeric film has a first refractive index when the network is substantially free of a fluid, and a second refractive index, different from the first refractive index, when the network comprises a predetermined amount of a fluid; introducing a fluid into the network; and detecting an optical change in the porous polymeric film to control light transmission across the light transmissive surface.

In another aspect, the present disclosure is directed to an optical element, including: a porous polymeric film having a first portion with a network of a plurality of interconnected voids, wherein the first portion of the porous polymeric film is optically diffusive to at least one wavelength of light when the network of interconnected voids is substantially free of fluid, and wherein the first portion of the porous polymeric film undergoes a detectable optical change upon fluid ingress into the network, or fluid egress from the network, of interconnected voids; a filler in a second portion of the porous polymeric film; a first polymeric film is on a first major surface of the porous polymeric film; and a second polymeric film different from the first polymeric film, on a second major surface of the porous polymeric film; wherein the first polymeric film is transmissive to visible light and the second polymeric film includes at least one of a pigment, a dye, an indicia, and combinations thereof.

The details of one or more examples of this disclosure are set forth in the accompanying drawings and the description below. Other features, objects, and advantages of this disclosure will be apparent from the description and drawings, and from the claims.

BRIEF DESCRIPTION OF DRAWINGS

FIG. 1A is a schematic cross-sectional view of an embodiment of a porous material in the absence of a fluid.

FIG. 1B is a schematic cross-sectional view of an embodiment of a porous material including a fluid therein.

FIGS. 6A-C are schematic cross-sectional views of various embodiments of closure members including a fluid sensor with a layer of a porous material.

FIGS. 8A-8B are schematic cross-sectional views of an embodiment of a light guide configuration.

FIGS. 9A and 9B are schematic cross-sectional views of an embodiment of a light guide configuration.

FIGS. 14A-14F are photographs of fluid deposited on the surface of a fluid sensor including a porous polymeric film of Example 1.

Like symbols in the drawings indicate like elements.

DETAILED DESCRIPTION

Figure 2A:
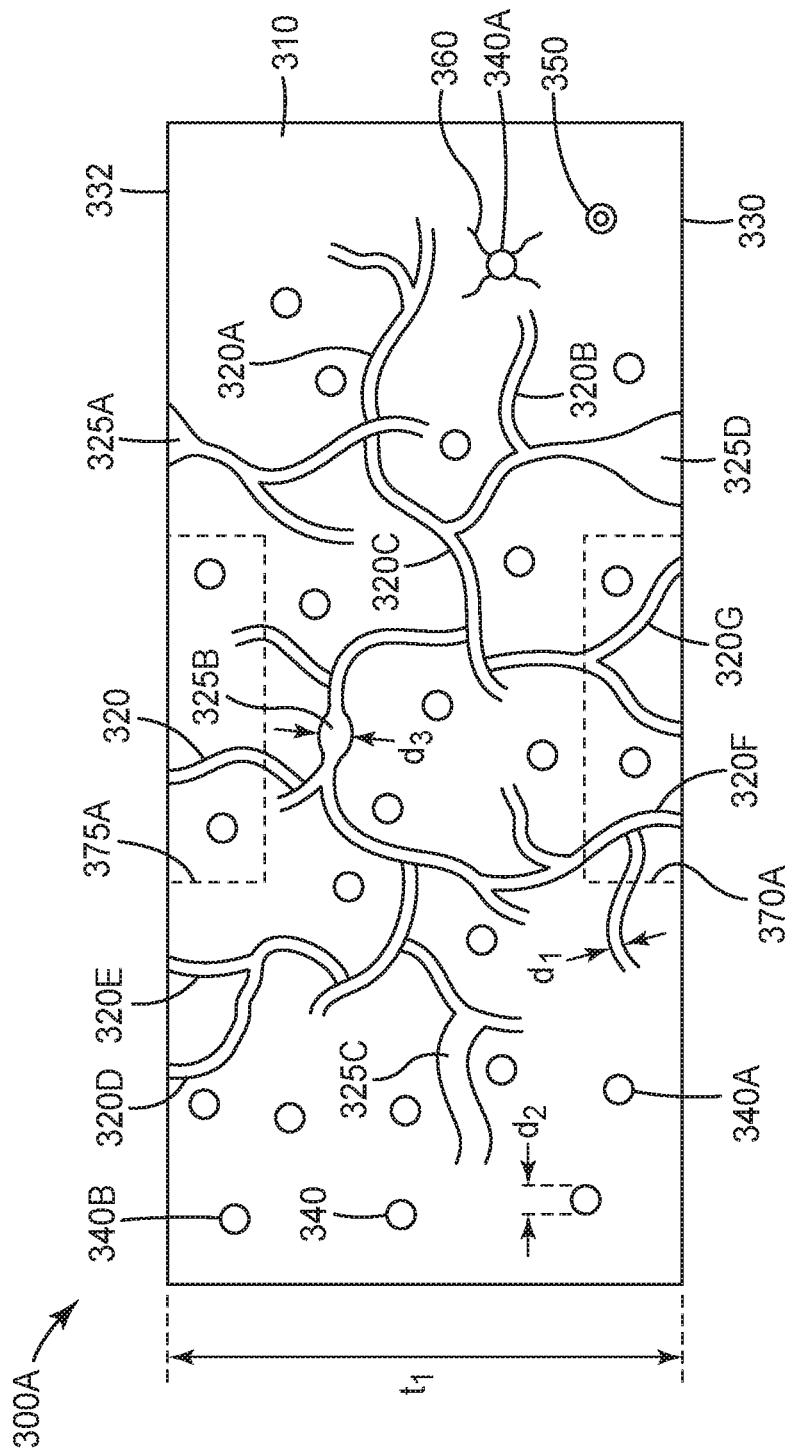
FIG. 2A is a schematic cross-sectional view of an embodiment of a layer of a porous material.

FIG. 1A is a schematic cross-sectional view of an optical construction 100A that includes a layer 102 of a porous material including a plurality of voids (not shown in FIG. 1A). When the porous layer 102 is dry, the layer 102 is mostly air, and is highly reflective to incoming light rays 103. The layer 102 has a substantially opaque appearance, due at least in part to refractive index differences at the plurality of scattering sites at the air-material interfaces within the layer 102. As shown schematically in FIG. 1B, in an optical construction 100B, at least a portion of the porous layer 104 is filled with a fluid, and the presence of the fluid in the voids reduces the number of scattering sites encountered by incoming light rays 105, which substantially eliminates the refractive indices at the air/material interfaces within the layer, and causes the layer 104 to be substantially transmissive to at least one wavelength of light.

When the fluid is removed from the voids in the porous layer 104 such as, for example, by evaporation, drying, chemical reaction, or the like, the layer 104 reverts to the opaque appearance of the layer 102 of FIG. 1A. Since the porous layers 102, 104 can be reversibly converted between opaque and transmissive states, the porous layers 102, 104 of FIGS. 1A-1B thus can be utilized to provide an optical sensor configured to detect the presence or absence of the fluid in the voids thereof.

A wide variety of porous materials may be used for the porous layers 102, 104. Suitable examples include, but are not limited to, the porous materials disclosed in U.S. Pat. Nos. 8,964,146 and 9,279,918; and in WO 2010/120468.

In general, suitable porous materials exhibit low-index-like optical properties, and in some embodiments can exhibit low-index-like optical properties. In some embodiments, the porosity can vary along a thickness direction, which forms a gradient porous material. Some of the gradient porous materials exhibit a local porosity, which may be described by a local void volume fraction, or as a local void size distribution, that varies along a thickness direction thereof.

Some suitable porous materials, when substantially free of fluid, have a low optical haze and a low effective index of refraction, such as an optical haze of less than about 5%, and an effective index of refraction that is less than about 1.35. Some suitable porous materials, when substantially free of fluid, have a high optical haze, such as an optical haze of greater than about 50%, and/or high diffuse optical reflectance, while manifesting some low-index-like optical properties, such as, for example, the ability to support total internal reflection or enhance internal reflection.

The porous materials include a plurality of interconnected voids, or a network of voids, dispersed in a polymeric binder or matrix material. At least some of the voids in the plurality or network are connected to one another via hollow tunnels or hollow tunnel-like passages.

In some embodiments, a void or multiple voids may include one or more small fiber- or string-like objects that include, for example, a binder and/or nanoparticles. In some cases, a void may include particles or particle agglomerates that may be attached to the binder, or may be loose within the void. Some suitable porous materials include multiple pluralities of interconnected voids or multiple networks of voids where the voids in each plurality or network are interconnected. In some cases, in addition to multiple pluralities of interconnected voids, the porous materials include a plurality of closed or unconnected voids, which means that the voids are not connected to other voids via tunnels.

In some embodiments, the porous materials can include a plurality of interconnected voids or a network of voids having a local volume fraction that varies along a thickness direction of the material. As used herein, "local volume fraction" means the volume fraction of a component (e.g., the plurality of interconnected voids) measured on a local scale, for example, in a region less than about 10%, or less than about 5%, or less than about 3%, or less than about 1% of the total thickness of a layer of the material. The local volume fraction of interconnected voids can vary across the thickness of the layer of the porous material, such that the local volume fraction of interconnected voids proximate one surface of the layer can be greater or less than the local volume fraction of interconnected voids proximate an opposing surface of the layer. The bulk volume fraction of interconnected voids is the ratio of the volume of voids in the layer of the porous material to the total volume of the layer.

In some cases, the local volume fraction of interconnected voids can be close to zero proximate one surface of the porous material (that is, there are very few interconnected voids), and the layer can be said to be essentially "sealed" on that surface. In some cases, the local volume fraction of interconnected voids can vary in a continuous manner throughout the porous material, such as either a monotonic increase or decrease in the local volume fraction across the thickness direction thereof. In some cases, the local volume fraction of interconnected voids can go through a local maximum or a local minimum in the volume fraction of interconnected voids across the thickness direction of the layer of the porous material. In some cases, the local volume fraction of interconnected voids can vary in a discontinuous manner along the thickness direction of the porous material, for example, a step-change in the local volume fraction of interconnected voids.

Control of the local volume fraction of interconnected voids can be useful in several applications including, for example, when a material is coated on a surface of a layer of the porous material. In some cases, the coated porous material may include a solvent or other high mobility component such as, for example, a low molecular weight curable material, which can penetrate the interconnected voids of the porous materials. In some cases, the coated porous material may include a thermoplastic solid or a gelled material, such as a transfer adhesive or a pressure sensitive adhesive (PSA) that, upon thermal cycling or aging, can penetrate into the porous structure of interconnected voids. Penetration of a material into the interconnected voids of the porous material can alter properties of the layer, including, for example, increasing the refractive index in the penetration region.

In one particular embodiment, a change in the local volume fraction of the interconnected voids can provide control over this penetration proximate one surface of a layer of the porous material, while maintaining a desired local volume fraction of the interconnected voids proximate an opposing surface of the layer. In some cases, the local volume fraction of interconnected voids proximate one surface of the porous material can be lower than the bulk volume fraction of interconnected voids and also lower than the local volume fraction proximate the opposing surface of the layer. In some cases, the local volume fraction of interconnected voids can be decreased so that only limited infusion can take place. In some cases, a lower volume fraction of interconnected voids in a porous polymeric material can improve the structural integrity and durability of the layer.

In some embodiments, the local volume fraction of interconnected voids can be decreased to near zero local volume fraction of interconnected voids, effectively sealing the surface of the porous material. Control of the local volume fraction of interconnected voids can include techniques such as, for example, inhibiting or promoting the rate and extent of cure on one or more surface of the porous material, infusion of a material to at least partially fill a portion of the voids, and the like. In general, control over the local volume fraction of interconnected voids can be accomplished by techniques described in, for example, WO 2011/050232, entitled "PROCESS FOR GRADIENT NANOVOIDED ARTICLE."

Some porous materials support total internal reflection (TIR) or enhanced internal reflection (EIR) by virtue of including a plurality of voids. When light that travels in an optically clear non-porous medium is incident on a stratum possessing high porosity, the reflectivity of the incident light is much higher at oblique angles than at normal incidence. In the case of no or low haze voided films, the reflectivity at oblique angles greater than the critical angle is close to about 100%. In such cases, the incident light undergoes total internal reflection (TIR). In the case of high haze voided porous materials, the oblique angle reflectivity can be close to 100% over a similar range of incident angles even though the light may not undergo TIR. This enhanced reflectivity for high haze films is similar to TIR and is designated as Enhanced Internal Reflectivity (EIR). As used herein, by a porous or voided material enhancing internal reflection (EIR), it is meant that the reflectance at the boundary of the voided and non-voided strata of the layer is greater with the voids than without the voids.

In some embodiments, the voids in the porous materials have an index of refraction $n_v$ and a permittivity $\in_v$, where $n_v^2 = \in_v$, and the binder has an index of refraction $n_b$ and a permittivity $\in_b$, where $n_b^2 = \in_b$. In general, the interaction of a porous material with light, such as light that is incident on, or propagates in, a layer of the material, depends on a number of film characteristics such as, for example, the layer thickness, the binder index, the void or void index, the void shape and size, the spatial distribution of the voids, and the wavelength of light. In some cases, light that is incident on or propagates within the gradient porous material, "sees" or "experiences" an effective permittivity $\in_{eff}$ and an effective index $n_{eff}$, where $n_{eff}$ can be expressed in terms of the void index $n_v$, the binder index $n_b$, and the void porosity or volume fraction "f." In such cases, the porous materials are sufficiently thick, and the voids are sufficiently small, so that light cannot resolve the shape and features of a single or isolated void. In such cases, the size of at least a majority of the voids, such as at least 60% or 70% or 80% or 90% of the voids, is not greater than about $\lambda/5$, or not greater than about λ/6, or not greater than about λ/8, or not greater than about λ/10, or not greater than about λ/20, where is the wavelength of light.

In some cases, light that is incident on a porous material is a visible light meaning that the wavelength of the light is in the visible range of the electromagnetic spectrum. In such cases, the visible light has a wavelength that is in a range from about 380 nm to about 750 nm, or from about 400 nm to about 700 nm, or from about 420 nm to about 680 nm. In such cases, the porous material has an effective index of refraction and includes a plurality of voids if the size of at least a majority of the voids, such as at least 60% or 70% or 80% or 90% of the voids, is not greater than about 70 nm, or not greater than about 60 nm, or not greater than about 50 nm, or not greater than about 40 nm, or not greater than about 30 nm, or not greater than about 20 nm, or not greater than about 10 nm.

In some embodiments, the porous materials are sufficiently thick so that a layer of the material can reasonably have an effective index that can be expressed in terms of the indices of refraction of the voids and the binder, and the void or void volume fraction or porosity. In such cases, the thickness of the layer of the porous material is not less than about 100 nm, or not less than about 200 nm, or not less than about 500 nm, or not less than about 700 nm, or not less than about 1,000 nm.

When the voids in the porous material are sufficiently small and the optical film is sufficiently thick, a layer of the material has an effective permittivity $\epsilon_{\it eff}$ that can be expressed as:

$$\epsilon_{\it eff} = f\epsilon_v + (1-f)\epsilon_b \qquad (1)$$

The effective index $n_{\it eff}$ of the porous layer can be expressed as:

$$n_{\it eff}^2 = f n_v^2 + (1-f) n_b^2 \qquad (2)$$

In some cases, such as when the difference between the indices of refraction of the voids and the binder is sufficiently small, the effective index of the layer of the porous material can be approximated by the following expression:

$$n_{\it eff} = f n_v + (1-f) n_b \qquad (3)$$

The effective refractive index of the layer of the porous material is the volume weighted average of the indices of refraction of the voids and the binder. For example, a porous material that has a void volume fraction of about 50% and a binder that has an index of refraction of about 1.5, has an effective index of about 1.25.

A layer of one such porous material 300A is illustrated in FIG. 2, which includes a network of voids or plurality of interconnected voids 320 and a plurality of optional particles 340 dispersed substantially uniformly within a binder 310. The layer of the porous material 300A has a porous interior by virtue of the presence of network of voids 320 within the layer. In general, the porous material can include one or more networks of interconnected voids. For example, the network of voids 320 can be regarded to include interconnected voids or voids 320A-320C.

In some embodiments, a local volume fraction of interconnected voids, for example a first local volume fraction of interconnected voids 370A and a second volume fraction of interconnected voids 375A, can vary along a thickness $t_1$ direction within the layer 300A. The local volume fraction of interconnected voids, and void size distribution, can vary along the thickness direction. In some cases, the network of voids 320 forms one or more passages between first and second major surfaces 330 and 332, respectively.

The network of voids can be regarded to include a plurality of interconnected voids. Some of the voids can be at a surface of the layer of the porous material 300A and can be regarded to be surface voids. For example, in the exemplary layer of the porous material 300A, voids 320D and 320E are at a second major surface 332 of the film and can be regarded as surface voids 320D and 320E, and voids 320F and 320G are at a first major surface 330 of the layer and can be regarded as surface voids 320F and 320G. Some of the voids, such as for example voids 320B and 320C, are within the interior of the layer 300A and away from the exterior surfaces thereof, and can be regarded as interior voids 320B and 320C, even though an interior void can be connected to a major surface via, for example, other voids.

The voids 320 have a size $d_1$ that can generally be controlled by choosing suitable composition and fabrication techniques, such as coating, drying and curing conditions. In general, $d_1$ can be any desired value in any desired range of values. For example, in some cases, at least a majority of the voids, such as at least 60% or 70% or 80% or 90% or 95% of the voids, have a size that is in a desired range. For example, in some cases, at least a majority of the voids, such as at least 60% or 70% or 80% or 90% or 95% of the voids, have a size that is not greater than about 10 microns, or not greater than about 7 microns, or not greater than about 5 microns, or not greater than about 4 microns, or not greater than about 3 microns, or not greater than about 2 microns, or not greater than about 1 micron, or not greater than about 0.7 microns, or not greater than about 0.5 microns.

In some cases, the plurality of interconnected voids 320 has an average void or void size that is not greater than about 5 microns, or not greater than about 4 microns, or not greater than about 3 microns, or not greater than about 2 microns, or not greater than about 1 micron, or not greater than about 0.7 microns, or not greater than about 0.5 microns.

In some embodiments, some of the voids can be sufficiently small so that their primary optical effect is to reduce the effective index, while some other voids can reduce the effective index and scatter light, while still some other voids can be sufficiently large so that their primary optical effect is to scatter light.

The optional particles 340 have a size $d_2$ that can be any desired value in any desired range of values. For example, in some cases at least a majority of the particles, such as at least 60% or 70% or 80% or 90% or 95% of the particles, have a size that is in a desired range. For example, in some cases, at least a majority of the particles, such as at least 60% or 70% or 80% or 90% or 95% of the particles, have a size that is not greater than about 5 microns, or not greater than about 3 microns, or not greater than about 2 microns, or not greater than about 1 micron, or not greater than about 700 nm, or not greater than about 500 nm, or not greater than about 200 nm, or not greater than about 100 nm, or not greater than about 50 nm.

In some cases, plurality of particles 340 has an average particle size that is not greater than about 5 microns, or not greater than about 3 microns, or not greater than about 2 microns, or not greater than about 1 micron, or not greater than about 700 nm, or not greater than about 500 nm, or not greater than about 200 nm, or not greater than about 100 nm, or not greater than about 50 nm.

In some cases, some of the particles can be sufficiently small so that they primary affect the effective index, while some other particles can affect the effective index and scatter light, while still some other particles can be sufficiently large so that their primary optical effect is to scatter light.

In some cases, $d_1$ and/or $d_2$ are sufficiently small so that the primary optical effect of the voids and the particles is to affect the effective index of layer of the porous material 300A. For example, in such cases, $d_1$ and/or $d_2$ are not greater than about $\lambda/5$, or not greater than about $\lambda/6$, or not greater than about $\lambda/8$, or not greater than about $\lambda/10$, or not greater than about $\lambda/20$, where is the wavelength of light. As another example, in such cases, $d_1$ and $d_2$ are not greater than about 70 nm, or not greater than about 60 nm, or not greater than about 50 nm, or not greater than about 40 nm, or not greater than about 30 nm, or not greater than about 20 nm, or not greater than about 10 nm. In such cases, the voids and the particles may also scatter light, but the primary optical effect of the voids and the particles is to define an effective medium in the layer 300A that has an effective index. The effective index depends, in part, on the indices of refraction of the voids, the binder, and the particles. In some cases, the effective index is a reduced effective index, meaning that the effective index is less than the index of the binder and the index of the particles.

In cases where the primary optical effect of the voids and/or the particles is to affect the index, $d_1$ and $d_2$ are sufficiently small so that a substantial fraction, such as at least about 60%, or at least about 70%, or at least about 80%, or at least about 90%, or at least about 95% of voids 320 and particles 340 have the primary optical effect of reducing the effective index. In such cases, a substantial fraction, such as at least about 60%, or at least about 70%, or at least about 80%, or at least about 90%, or at least about 95% the voids and/or the particles, have a size that is in a range from about 1 nm to about 200 nm, or from about 1 nm to about 150 nm, or from about 1 nm to about 100 nm, or from about 1 nm to about 50 nm, or from about 1 nm to about 20 nm.

In some cases, the index of refraction $n_1$ of particles 340 can be sufficiently close to the index $n_b$ of binder 310, so that the effective index does not depend, or depends very little, on the index of refraction of the particles. In such cases, the difference between $n_1$ and $n_b$ is not greater than about 0.01, or not greater than about 0.007, or not greater than about 0.005, or not greater than about 0.003, or not greater than about 0.002, or not greater than about 0.001. In some cases, particles 340 are sufficiently small and their index is sufficiently close to the index of the binder, that the particles do not primarily scatter light or affect the refractive index. In such cases, the primary effect of the particles can, for example, be to enhance the strength of the layer of the porous material 300A. In some cases, particles 340 can enhance the process of making the porous material, although in some embodiments the layer 300A can be made with no particles.

In cases where the primary optical effect of network of voids 320 and particles 340 is to affect the effective index and not to, for example, scatter light, the optical haze of the layer of porous material 300A that is due to voids 320 and particles 340 is not greater than about 5%, or not greater than about 4%, or not greater than about 3.5%, or not greater than about 4%, or not greater than about 3%, or not greater than about 2.5%, or not greater than about 2%, or not greater than about 1.5%, or not greater than about 1%. In such cases, the effective index of the effective medium of the layer of porous material is not greater than about 1.35, or not greater than about 1.3, or not greater than about 1.25, or not greater than about 1.2, or not greater than about 1.15, or not greater than about 1.1, or not greater than about 1.05.

In cases where the layer of porous material 300A can reasonably have a reduced effective index, the thickness of the layer is not less than about 100 nm, or not less than about 200 nm, or not less than about 500 nm, or not less than about 700 nm, or not less than about 1,000 nm, or not less than about 1500 nm, or not less than about 2000 nm.

In some cases, $d_1$ and/or $d_2$ are sufficiently large so that their primary optical effect is to scatter light and produce optical haze. In such cases, $d_1$ and/or $d_2$ are not less than about 200 nm, or not less than about 300 nm, or not less than about 400 nm, or not less than about 500 nm, or not less than about 600 nm, or not less than about 700 nm, or not less than about 800 nm, or not less than about 900 nm, or not less than about 1000 nm. In such cases, the voids and the particles may also affect the index, but their primarily optical effect is to scatter light. In such cases, light incident on the layer 300A can be scattered by both the voids and the particles.

In some cases, layer of porous material 300A has a low optical haze. In such cases, the optical haze of the layer 300A is not greater than about 5%, not greater than about 4%, not greater than about 3.5%, not greater than about 4%, not greater than about 3%, not greater than about 2.5%, not greater than about 2%, not greater than about 1.5%, or not greater than about 1%. In such cases, the layer of porous material 300A can have a reduced effective index that is not greater than about 1.35, not greater than about 1.3, not greater than about 1.2, not greater than about 1.15, not greater than about 1.1, or not greater than about 1.05. For light normally incident on the layer of the porous material 300A, optical haze, as used herein, is defined as the ratio of the transmitted light that deviates from the normal direction by more than 4 degrees to the total transmitted light. Haze values were measured using a HAZE-GARD PLUS haze meter (available from BYK-Gardner, Silver Springs, Md.) according to the procedure described in ASTM D1003.

In some cases, the layer of the porous material 300A has a high optical haze. In such cases, the haze of the porous material 300A is not less than about 40%, not less than about 50%, not less than about 60%, not less than about 70%, not less than about 80%, not less than about 90%, or not less than about 95%. In some cases, the layer 300A can have an intermediate optical haze, for example, between about 5% and about 50% optical haze.

In some embodiments, the layer of the porous material 300A has a high diffuse optical reflectance. In such cases, the diffuse optical reflectance of the layer 300A is not less than about 30%, not less than about 40%, not less than about 50%, or not less than about 60%.

In some embodiments, the layer of the porous material 300A has a high optical clarity. For light normally incident on the layer 300A, optical clarity, as used herein, refers to the ratio $(T_2-T_1)/(T_1+T_2)$, where $T_1$ is the transmitted light that deviates from the normal direction between 1.6 and 2 degrees, and $T_2$ is the transmitted light that lies between zero and 0.7 degrees from the normal direction. Clarity values were measured using a Haze-Gard Plus haze meter from BYK-Gardner. In the cases where the layer of the porous material 300A has a high optical clarity, the clarity is not less than about 40%, or not less than about 50%, or not less than about 60%, or not less than about 70%, or not less than about 80%, or not less than about 90%, or not less than about 95%.

In some embodiments, the layer of the porous material 300A has a low optical clarity. In such cases, the optical clarity of the layer 300A is not greater than about 10%, not greater than about 7%, not greater than about 5%, not greater than about 4%, not greater than about 3%, not greater than about 2%, or not greater than about 1%.

In general, the layer of the porous material 300A can have any porosity or void volume fraction that may be desirable in an application. In some cases, the volume fraction of plurality of voids 320 in the layer 300A is not less than about 20%, not less than about 30%, not less than about 40%, not less than about 50%, not less than about 60%, not less than about 70%, not less than about 80%, or not less than about 90%.

In some cases, the layer of the porous material 300A can manifest some low-index properties, even if the film has a high optical haze and/or diffuse reflectance. For example, in such cases, the layer 300A can support TIR at angles that correspond to an index that is smaller than the index $n_b$ of the binder 310.

In some embodiments, the particles 340, such as particles 340A and 340B, are solid particles. In some cases, layer of the porous material 300A may additionally or alternatively include a plurality of hollow or porous particles 350.

The particles 340 can be any type of particles that may be desirable in an application, and may selected from organic or inorganic particles. For example, in some non-limiting embodiments, the particles 340 can be silica, zirconium oxide or alumina particles.

The particles 340 can have any shape that may be desirable or available in an application, and can have a regular or an irregular shape. In various embodiments, the particles 340 can be approximately spherical, or can be elongated. In such cases, the layer of the porous material 300A includes a plurality of elongated particles 340B. In some cases, elongated particles 340B have an average aspect ratio that is not less than about 1.5, or not less than about 2, or not less than about 2.5, or not less than about 3, or not less than about 3.5, or not less than about 4, or not less than about 4.5, or not less than about 5. In some cases, the particles 340 can be in the form or shape of a string-of-pearls (such as those available from Nissan Chemical, Houston, Tex., under the trade designation SNOWTEX-PS), or aggregated chains of spherical or amorphous particles, such as fumed silica. In some embodiments, the particles 340 can be highly structured, high surface area fumed metal oxides, such as fumed silica oxides, can be used in a mixture of a suitable binder to form a composite structure that combines binder, particles, voids, and optionally crosslinkers or other adjuvant materials. The desirable binder to particle ratio depends on the type of process used to form the interconnected voided structure. Suitable materials and processes include, but are not limited to, those described in U.S. Pat. No. 9,588,262, which is incorporated herein by reference.

The particles 340 may or may not be functionalized. In some cases, the particles 340 are functionalized so that particles 340 can be dispersed in a desired solvent or binder 310 with no, or very little, clumping. In some cases, particles 340 can be further functionalized to chemically bond to the binder 310. For example, particles 340, such as particle 340A, can be surface modified and have reactive functionalities or groups 360 to chemically bond to binder 310. In such cases, at least a significant fraction of particles 340 is chemically bound to binder 310. In some cases, particles 340 do not have reactive functionalities to chemically bond to binder 310. In such cases, particles 340 can be physically bound to binder 310, or binder 310 can encapsulate particles 340.

In some cases, some of particles 340 have reactive groups and others do not have reactive groups. For example, in some cases, about 10% of particles 340 have reactive groups and about 90% of particles 340 do not have reactive groups, or about 15% of particles 340 have reactive groups and about 85% of particles 340 do not have reactive groups, about 20% of particles 340 have reactive groups and about 80% of particles 340 do not have reactive groups, or about 25% of particles 340 have reactive groups and about 75% of particles 340 do not have reactive groups, about 30% of particles 340 have reactive groups and about 60% of particles 340 do not have reactive groups, about 35% of particles 340 have reactive groups and about 65% of particles 340 do not have reactive groups, about 40% of particles 340 have reactive groups and about 60% of particles 340 do not have reactive groups, about 45% of particles 340 have reactive groups and about 55% of particles 340 do not have reactive groups, or about 50% of particles 340 have reactive groups and about 50% of particles 340 do not have reactive groups. In some cases, some of particles 340 may be functionalized with both reactive and unreactive groups on the same particle.

The ensemble of particles 340 may include a mixture of sizes, reactive and non-reactive particles 340, and different types of particles 340, for example, organic particles including polymeric particles such as acrylics, polycarbonates, polystyrenes, silicones and the like; or inorganic particles such as glasses or ceramics including, for example, silica and zirconium oxide, and the like. In some embodiments, the particles 340 may have covalently bonded alternating layers and a varying refractive index such as, for example, the particles described in WO 2016/168147, which is incorporated herein by reference.

Exemplary particles include fumed metal oxides or pyrogenic metal oxides, such as, for example, a fumed silica or alumina. In some embodiments, particles that are highly branched or structured may be used. Such particles prevent efficient packing in the binder matrix and allow interstitial voids or pores to form. Exemplary materials include highly branched or structured particles include Cabo-Sir fumed silicas or silica dispersions, such as, for example, those sold under trade designations TS 520, or pre-dispersed fumed silica particles such as those available under the trade designation Cabo-Sperse PG 001, PG 002, 1020K, 1015 (available from Cabot Corporation). Fumed alumina oxides are also useful structured particles to form a low refractive index system although silica may be preferred since it has an inherently lower skeletal refractive index than alumina Examples of alumina oxide are available under the trade name Cabo-Sperse, such as, for example, those sold under the trade designation Carbo-Sperse PG003 or Cabot Spec-A1 from Cabot Corp. In some embodiments, aggregates of these exemplary fumed metal oxides include a plurality of primary particles in the range of about 8 nm to about 20 nm and form a highly branched structure with a wide distribution of sizes ranging from about 80 nm to greater than 300 nm. In some embodiments, these aggregates pack randomly in a unit volume of a coating to form a mesoporous structure with complex bi-continuous network of channels, tunnels, and pores which entrap air in the network and thus lower the density and refractive index of the coating. Other useful porous materials are derived from naturally occurring inorganic materials such as clays, barium sulfates, aluminum, silicates and the like. The low refractive index layer has an effective refractive index of 1.23 or less when the metal oxide is silica oxide and 1.33 or less then the metal oxide is alumina oxide.

Fumed silica particles can also be treated with a surface treatment agent. Surface treatment of the metal oxide particles can provide, for example, improved dispersion in the polymeric binder, altered surface properties, enhanced particle-binder interactions, and/or reactivity. In some embodiments, the surface treatment stabilizes the particles so that the particles are well dispersed in the binder, resulting in a substantially more homogeneous composition. The incorporation of surface modified inorganic particles can be tailored, for example, to enhance covalent bonding of the particles to the binder, thereby providing a more durable and more homogeneous polymer/particle network.

The preferred type of treatment agent is determined, in part, by the chemical nature of the metal oxide surface. Silanes are preferred for silica and other siliceous fillers. In the case of silanes, it may be preferred to react the silanes with the particle surface before incorporation into the binder. The required amount of surface modifier is dependent upon several factors such as, for example, particle size, particle type, modifier molecular weight, and/or modifier type. The silane modifier can have reactive groups that form covalent bonds between particles and the binder, such as, for example, carboxy, alcohol, isocynanate, acryloxy, epoxy, thiol or amines. Conversely, the silane modifier can have non-reactive groups, such as, for example, alkyl, alkloxy, phenyl, phenyloxy, polyethers, or mixtures thereof. Such non-reactive groups may modify the surface of the coatings to improve, for example, soil and dirt resistance or to improve static dissipation. Commercially available examples of a surface modified silica particle include, for example, are those available from Cabot Corp. under the trade designation Cabo-Sil TS 720 and TS 530. It may sometimes be desirable to incorporate a mixture of functional and non-function groups on the surface of the particles to obtain a combination of these desirable features.

Representative embodiments of surface treatment agents suitable for use in the compositions of the present disclosure include, for example, N-(3-triethoxysilylpropyl)methoxyethoxyethyl carbamate, N-(3-triethoxysilylpropyl) methoxyethoxyethyl carbamate, 3-(methacryloyloxy) propyltrimethoxysilane, 3-acryloxypropyltrimethoxysilane, 3-(methacryloyloxy)propyltriethoxysilane, 3-methacryloyloxy)propylmethyldimethoxysilane, 3-(acryloyloxypropyl) methyldimethoxysilane,
3-methacryloyloxy)propyldimethylethoxysilane,
3-methacryloyloxy)propyldimethylethoxysilane, vinyldimethylethoxysilane, phenyltrimethoxysilane, n-octyltrimethoxysilane, dodecyltrimethoxysilane, octadecyltrimethoxysilane,
propyltrimethoxysilane, hexyltrimethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltris-isobutoxysilane, vinyltriisopropenoxysilane, vinyltris (2-methoxyethoxy)silane, styrylethyltrimethoxysilane, mercaptopropyltrimethoxysilane, 3-glycidoxypropyltrimethoxysilane, acrylic acid, methacrylic acid, oleic acid, stearic acid, dodecanoic acid, 2-[2-(2-methoxyethoxy)ethoxy]acetic acid (MEEAA), beta-carboxyethylacrylate (BCEA), 2-(2-methoxyethoxy) acetic acid, methoxyphenyl acetic acid, and mixtures thereof.

The binder 310 can be or can include any material that may be desirable in an application. For example, in some embodiments, which are not intended to be limiting, the binder 310 can be derived from thermosetting, thermoplastic, and UV curable polymeric materials. Examples include, but are not limited to, polyvinylalcohol (PVA), polyvinylbutyral (PVB), polyvinyl pyrrolidone (PVP), polyethylene vinyl acetate copolymers (EVA), cellulose acetate butyrate (CAB), polyurethanes (PURs), polymethylmethacrylate (PMMA), polyacrylates, epoxies, silicones, and fluoropolymers.

The binders can be soluble in a suitable solvent such as, for example, water, ethyl acetate, acetone, 2-butone, and the like, and can be used as dispersions or emulsions.

Examples of some commercially available binders useful in the mixtures are those available from Kuraray-USA, Wacker Chemical, Dyneon LLC, and Rohm and Haas. Although the binder can be a polymeric system, it can also be added as a polymerizable monomeric system, such as a UV, or thermally curable or crosslinkable system. Examples of such systems would be UV polymerizable acrylates, methacrylates, multi-functional acrylates, urethane-acrylates, and mixtures thereof. Some typical examples would be 1,6 hexane diol diacrylate, trimethylol propane triacrylate, pentaerythritol triacryalate. Such systems are readily available from suppliers such as Neo Res (Newark, Del.), Arkema (Philadelphia, Pa.), or Sartomer (Exton, Pa.). Actinic radiation such as electron beam (E-beam), gamma and UV radiation are useful methods to initiate the polymerization of these systems, with many embodiments utilizing UV active systems. Other useful binder systems can also be cationically polymerized, such systems are available as vinyl ethers and epoxides.

The polymeric binders can also be formulated with cross linkers that can chemically bond with the polymeric binder to form a crosslinked network. Although the formation of crosslinks is not a prerequisite for the formation of the porous structure or the low refractive index optical properties, it is often desirable for other functional reasons such as to improve the cohesive strength of the coating, adhesion to the substrate or moisture, or thermal and solvent resistance. The specific type of crosslinker is dependent upon the binder used. Typical crosslinkers for polymeric binders such as PVA would be diisocyanates, titantates such as those available under the trade designation TYZOR-LA f from DowDuPont, Midland, Mich., poly(epichlorhydrin)amide adducts such as PolyCup 172, (available from Hercules, Wilmington, Del.), multi-functional aziridines such as CX100 (available from Neo-Res, Newark, Del.) and boric acid, diepoxides, diacids and the like.

The polymeric binders may form a separate phase with the particle aggregates or may be inter-dispersed between the particle aggregates in a manner to "bind" the aggregates together into a structures that connect with the metal oxidize particles through direct covalent bond formation or molecular interactions such as ionic, dipole, van Der Waals forces, hydrogen bonding and physical entanglements with the metal oxides.

Optical film 300 can be produced using any method that may be desirable in an application. Generally, in one process, first a solution is prepared that includes a plurality of particles 340, such as nanoparticles, and a polymerizable material dissolved in a solvent, where the polymerizable material can include, for example, one or more types of monomers. Next, the polymerizable material is polymerized, for example by applying heat or light, to form an insoluble polymer matrix in the solvent. In one example, the polymerization occurs in an environment that has an elevated level of oxygen adjacent one of the surfaces, inhibiting the polymerization near that surface to create a gradient optical film. In one example, a concentration of photoinitiator near one of the surfaces is increased relative to another surface, to create a gradient optical film.

In some cases, after the polymerization step, the solvent may still include some of the polymerizable material, although at a lower concentration. Next, the solvent is removed by drying or evaporating the solution resulting in optical film 300 that includes a network, or a plurality, of voids 320 dispersed in polymer binder 310. Optical film 300 further includes plurality of particles 340 dispersed in the polymer. Particles 340 are bound to binder 310, where the bonding can be physical or chemical, or be encapsulated by binder 310.

The porous material 300A can have other materials in addition to binder 310 and particles 340. For example, porous polymeric film 300 can include one or more additives, such as for example, coupling agents, to help wet the surface of a substrate, not expressly shown in FIG. 1, on which the layer 300 is formed. As another example, the porous layer 300A can include one or more colorants, such a carbon black, for imparting a color, such as the black color, to the layer. Other exemplary materials in the layer of the porous material 300A include initiators, such as one or more photo-initiators, anti-stats, UV absorbers and release agents. In some cases, the layer 300A can include a down converting material that is capable of absorbing light and reemitting a longer wavelength light. Exemplary down-converting materials include phosphors.

In general, porous layer 300A 300 can have a desirable porosity for any weight ratio of binder 310 to plurality of particles 340. Accordingly, in general, the weight ratio can be any value that may be desirable in an application. In some cases, the weight ratio of binder 310 to plurality of particles 340 is not less than about 1:2.5, not less than about 1:2.3, not less than about 1:2, not less than about 1:1, not less than about 1.5:1, not less than about 2:1, not less than about 2.5:1, not less than about 3:1, not less than about 3.5:1, not less than about 4:1, or not less than about 5:1. In some cases, the weight ratio is in a range from about 1:2.3 to about 4:1.

In some cases, top major surface 332 of the layer of the porous material 300A can be treated to, for example, improve the adhesion of optical film 300 to another layer. For example, top major surface 332 can be corona treated.

FIGS. 2B-2G are schematic side-views of a gradient porous layers 300B-300G, respectively, according to different aspects of the disclosure. For clarity, the numbered elements 310-360 and the sizes $d_1$-$d_3$ described for FIG. 2A are not shown in FIGS. 2B-2G; however, each of the descriptions provided for gradient porous materials 300A of FIG. 2A also correspond to the gradient porous layers 300B-300 of FIGS. 2B-2G, respectively. For example, suitable techniques for creating the gradient porous materials 300B-300G are described, for example, in WO 2011/050232.

Figure 2B:
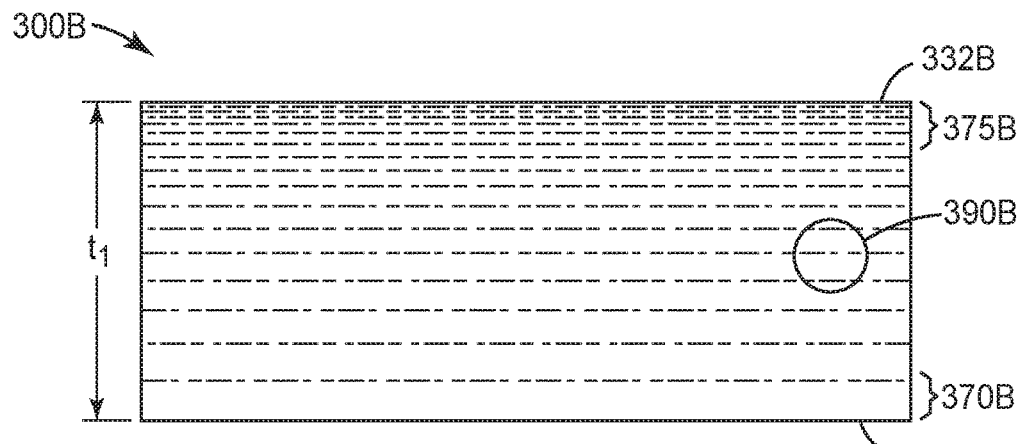
FIGS. 2B-2G are schematic cross-sectional views of gradient layers of porous materials.

In FIG. 2B, gradient porous layer 300B includes a local volume fraction of interconnected voids 390B that varies along the thickness direction, for example, in a monotonic manner as shown. In one particular embodiment, a first local volume fraction of interconnected voids 370B proximate a first surface 330B of gradient porous layer 300B is lower than a second local volume fraction of interconnected voids 375B proximate a second surface 332B of the layer 300B.

Gradient porous layer 300B can be prepared using a variety of techniques, as described elsewhere. In one particular embodiment, gradient porous layer 300B can be prepared, for example, using an absorbance based technique where the intensity of polymerization light decreases from first surface 330B to second surface 332B.

Figure 2C:
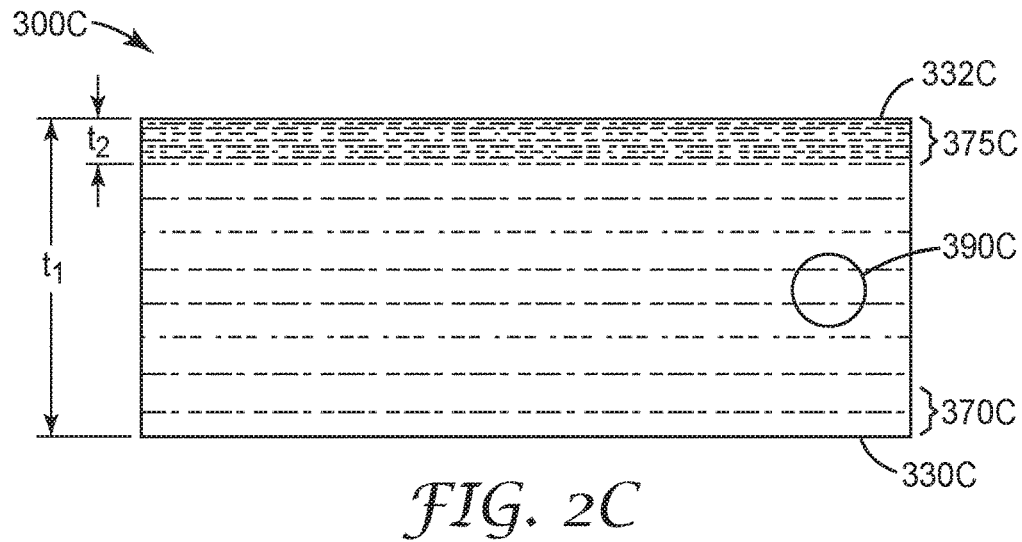

In FIG. 2C, gradient porous layer 300C includes a local volume fraction of interconnected voids 390C that varies along the thickness direction, for example, in a step-wise manner as shown. In one particular embodiment, a first local volume fraction of interconnected voids 370C proximate a first surface 330C of gradient porous layer 300C is lower than a second local volume fraction of interconnected voids 375C proximate a second surface 332C of the layer 300C. In some cases, for example, shown FIG. 2C, first local volume fraction of interconnected voids 370C transitions sharply (that is, step-wise) to second local volume fraction of interconnected voids 375C. In some cases, a thickness $t_2$ of the second volume fraction of interconnected voids 375C can be a small percentage of the total thickness $t_1$, for example, from about 1% to about 5%, or to about 10%, or to about 20%, or to about 30% or more of the total thickness $t_1$.

The gradient porous layer 300C can be prepared using a variety of techniques, as described elsewhere. In one particular embodiment, the gradient porous layer 300C can be prepared, for example, by using a difference in the polymerization initiator concentration or a difference in the polymerization inhibitor concentration proximate the first and second surfaces (330C, 332C).

Figure 2D:
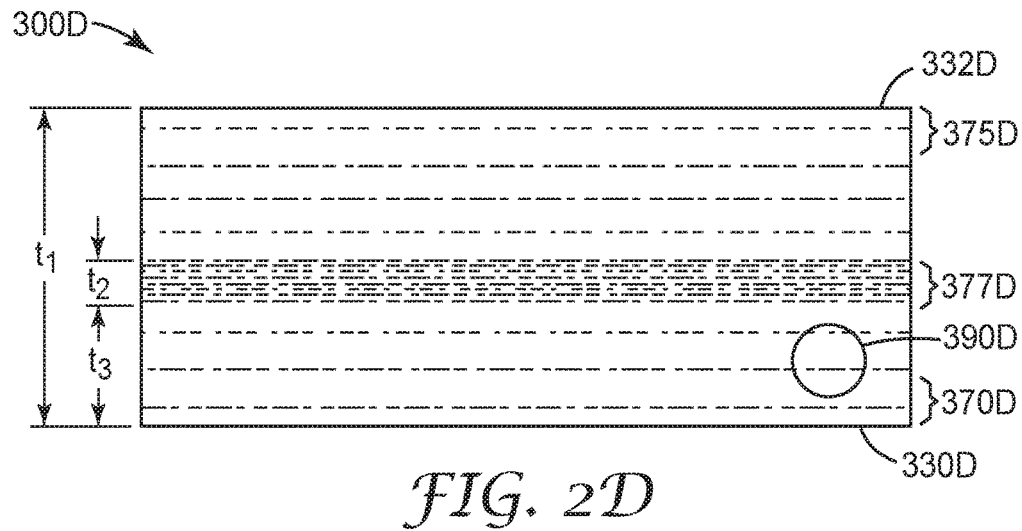

In FIG. 2D, gradient porous layer 300D includes a local volume fraction of interconnected voids 390D that varies along the thickness direction, for example, having a minimum local volume fraction of interconnected voids 377D as shown. In one particular embodiment, a first local volume fraction of interconnected voids 370D proximate a first surface 330D of gradient porous layer 300D is approximately the same as a second local volume fraction of interconnected voids 375D proximate a second surface 332D of the film 300D. In some cases, for example, shown FIG. 2D, first local volume fraction of interconnected voids 370D transitions sharply (that is, step-wise) to minimum local volume fraction of interconnected voids 377D. In some cases, a thickness $t_2$ of the minimum volume fraction of interconnected voids 377D can be a small percentage of the total thickness $t_1$, for example, from about 1% to about 5%, or to about 10%, or to about 20%, or to about 30% or more of the total thickness $t_1$. In some cases, the relative position of the minimum local volume fraction of interconnected voids 377D can be located anywhere, for example, at thickness $t_3$ from first surface 330D, within gradient porous layer 300D.

Gradient porous layer 300D can be prepared using a variety of techniques, as described elsewhere. In one particular embodiment, the porous polymeric optical film 300D can be prepared, for example, by laminating a pair of the gradient optical films 300C shown in FIG. 2C to each other, along the second surfaces 332C.

Figure 2E:
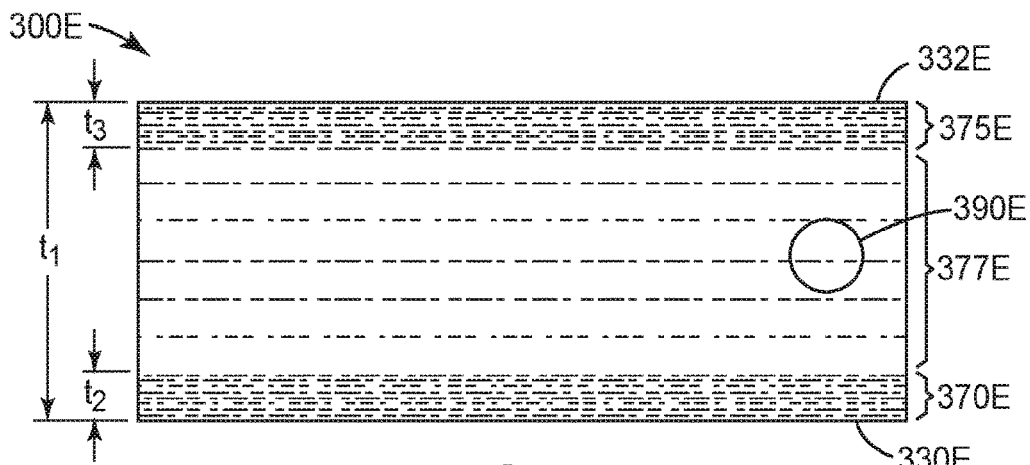

In FIG. 2E, gradient porous layer 300E includes a local volume fraction of interconnected voids 390E that varies along the thickness direction, for example, having a step-change local volume fraction of interconnected voids proximate a first and a second surface 330E, 332E, as shown. In one particular embodiment, a first local volume fraction of interconnected voids 370E proximate a first surface 330E of porous polymeric optical film 300E is approximately the same as a second local volume fraction of interconnected voids 375E proximate a second surface 332E of the film 300E. In some cases, for example, shown FIG. 1E, first local volume fraction of interconnected voids 370E transitions sharply (that is, step-wise) to maximum local volume fraction of interconnected voids 377E. In some cases, a thickness $t_2$ and $t_3$ of the first and second local volume fraction of interconnected voids 370E and 375E, respectively, can be a small percentage of the total thickness $t_1$, for example, from about 1% to about 5%, or to about 10%, or to about 20%, or to about 30% or more of the total thickness $t_1$. In some cases, each of the first and second local volume fraction of interconnected voids 370E and 375E can have transitions that are not step-wise (not shown, but similar to the monotonic variation shown in FIG. 2B).

Gradient porous layer 300E can be prepared using a variety of techniques, as described elsewhere. In one particular embodiment, gradient porous layer 300E can be prepared, for example, by laminating a pair of the porous polymeric optical films 300C shown in FIG. 2C to each other, along the first surfaces 330C.

Figure 2F:
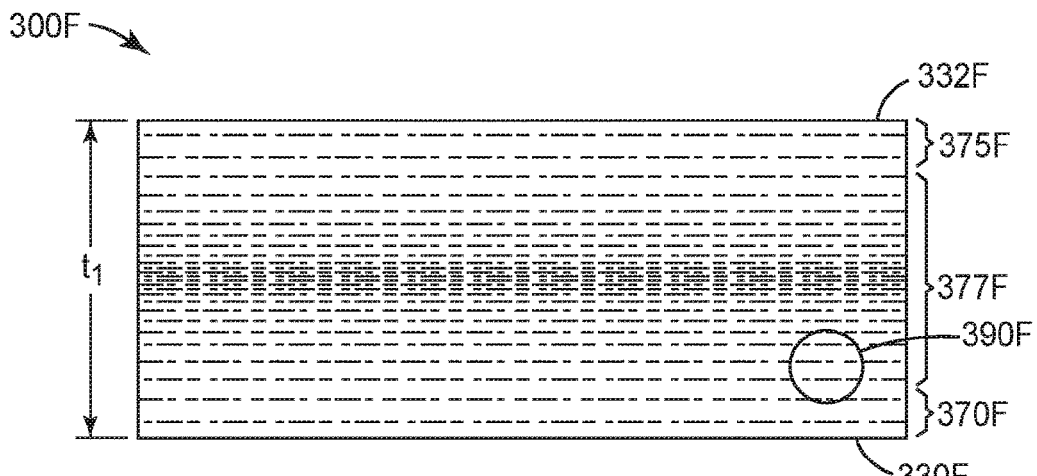

In FIG. 2F, gradient porous layer 300F includes a local volume fraction of interconnected voids 390F that varies along the thickness direction, for example, having a gradient minimum local volume fraction of interconnected voids 377F as shown. In one particular embodiment, a first local volume fraction of interconnected voids 370F proximate a first surface 330F of gradient porous layer 300F is approximately the same as a second local volume fraction of interconnected voids 375F proximate a second surface 332F of the film 300F. In some cases, for example, shown FIG. 2F, first local volume fraction of interconnected voids 370F transitions gradually (that is, in a monotonic gradient) to a minimum local volume fraction of interconnected voids 377F, and again transitions gradually to the second volume fraction of interconnected voids 375F.

Figure 2G:
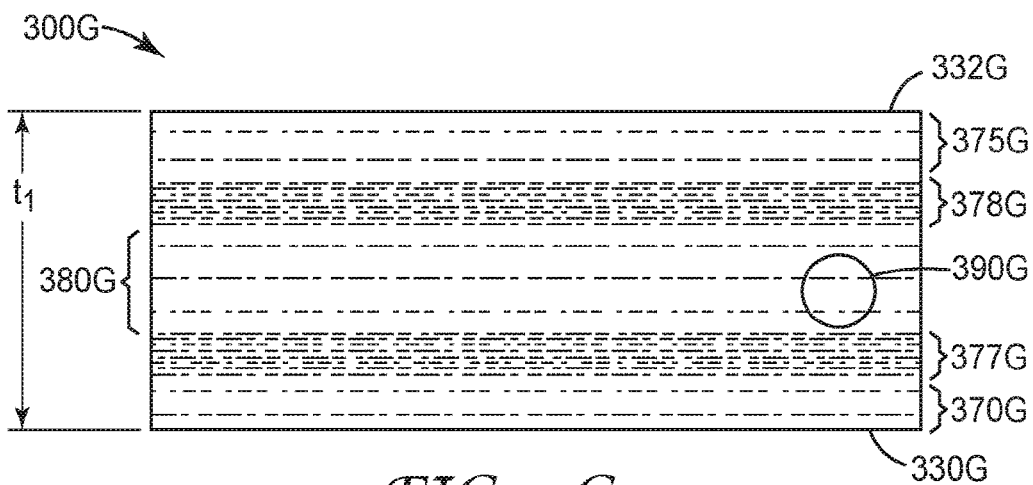

Gradient porous layer 300F can be prepared using a variety of techniques, as described elsewhere. In one particular embodiment, gradient porous layer 300F can be prepared, for example, by laminating a pair of the gradient porous layers 300B shown in FIG. 2B to each other, along the second surfaces 332B.

n FIG. 2G, gradient porous layer 300G includes a local volume fraction of interconnected voids 390G that varies along the thickness direction, for example, having a pair of step-change local volume fraction of interconnected voids 377G, 378G, as shown. In one particular embodiment, a first local volume fraction of interconnected voids 370G proximate a first surface 330G of gradient porous layer 300G is approximately the same as a second local volume fraction of interconnected voids 375G proximate a second surface 332G of the film 300G. In some cases, for example, shown FIG. 2G, first local volume fraction of interconnected voids 370E transitions sharply (that is, step-wise) to minimum local volume fraction of interconnected voids 377G, transitions sharply again to a maximum local volume fraction of interconnected voids 380G, transitions sharply again to a minimum local volume fraction of interconnected voids 378G, and finally transitions sharply yet again to the second local volume fraction of interconnected voids 375G. In some cases, each of the local volume fraction of interconnected voids can have transitions that are not step-wise (not shown, but similar to the monotonic variation shown in FIG. 2B).

Gradient porous layer 300G can be prepared using a variety of techniques, as described elsewhere. In one particular embodiment, gradient optical film 300G can be prepared, for example, by a multilayer coating technique, where a different photoinitiator concentration can be used in strata corresponding to minimum local void volume fraction (377G, 378G) than in strata corresponding to maximum local void volume fraction 390G. In one particular embodiment, gradient optical film 300G can be prepared, for example, by a multilayer coating technique, where the strata include different ratios of polymeric binder to particles.

Figure 3:
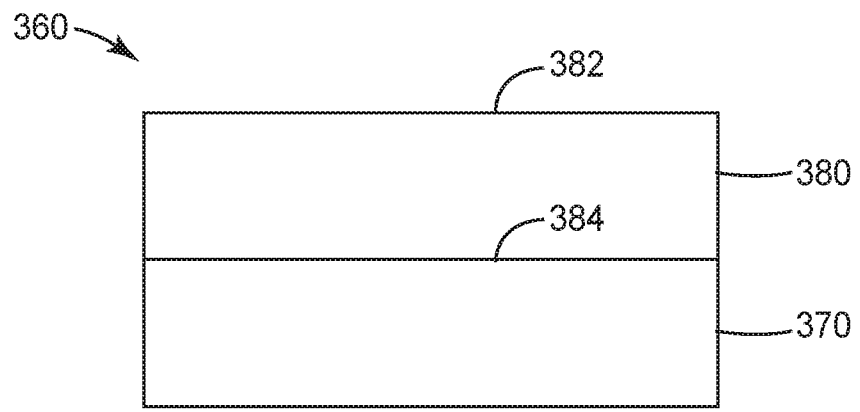
FIG. 3 is a schematic cross-sectional view of an embodiment of an optical construction.

FIG. 3 is a schematic cross-sectional view of an optical construction 360, which includes a porous polymeric film 380 disposed on a substrate 370. The porous polymeric film 380 can be include single or multiple layers, where each layer may be the same or different. In some cases, the porous polymeric film 380 may be coated directly onto substrate 370. In some cases, the porous polymeric film 380 may be first formed and thereafter transferred onto substrate 370, which can be translucent, transparent, or opaque.

The substrate 370 can be or can include any material that may be suitable in an application, such as a polymeric material (for example, a biocompatible plastic for a medical device), a dielectric, a semiconductor, or a conductor (such as a metal). For example, the substrate 370 can include or be made of glass and polymers such as polyethylene terephthalate (PET), polycarbonates, and acrylics. In some cases, substrate 370 can include a polarizer such as a reflective polarizer, an absorbing polarizer, a wire-grid polarizer, or a fiber polarizer. In some case, substrate 370 can include multiple layers. In some cases, substrate 370 can include a structured surface, such as a surface having a plurality of microstructures.

In some embodiments, the substrate 370 is a release liner that may thereafter be stripped away from a surface 384 of the porous polymeric film 380 to expose a major surface 384 of the porous polymeric film 380 that can, for example, be bonded to another substrate or surface. In some embodiments, which are not intended to be limiting, the release force for releasing porous polymeric film 380, which can be a low index layer, from a release liner 370 is generally less than about 200 g-force/inch, or less than about 150 g-force/inch, or less than about 100 g-force/inch, or less than about 75 g-force/inch, or less than about 50 g-force/inch.

In some embodiments, the substrate 370 is a fiber polarizer, which includes a plurality of substantially parallel fibers that form one or more layers of fibers embedded within a binder with at least one of the binder and the fibers including a birefringent material. The substantially parallel fibers define a transmission axis and a reflection axis. The fiber polarizer substantially transmits incident light that is polarized parallel to the transmission axis and substantially reflects incident light that is polarized parallel to the reflection axis. A fiber polarizing film is a matrix layer that contains multiple fibers having internal birefringent interfaces, i.e. interfaces between a birefringent material and another material. The parameters of the fibers in a fiber polarizer film can be selected to enhance polarization.

In some cases, substrate 370 can include a partial reflector. A partial reflector is an optical element or a collection of optical elements which reflect at least 30% of incident light while transmitting the remainder, minus absorption losses. Suitable partial reflectors include, for example, foams, polarizing and non-polarizing multilayer optical films, microreplicated structures (e.g. BEF), polarized and non-polarized blends, wire grid polarizers, partially transmissive metals such as silver or nickel, metal/dielectric stacks such as silver and indium tin oxide, and asymmetric optical films. Perforated partial reflectors or mirrors can also be useful as partial reflectors, such as, for example, those available from 3M under the trade designation Enhanced Specular Reflector ("ESR").

In addition, asymmetric reflective films may be desirable for certain applications. In that case, average transmission along one stretch direction may be desirably less than, for example, 50%, while the average transmission along the other stretch direction may be desirably less than, for example 20%, over a bandwidth of, for example, the visible spectrum (400-700 nm), or over the visible spectrum and into the near infrared (e.g., 400-850 nm).

In addition, although partial reflector films and asymmetric reflective films are discussed separately herein, it should be understood that two or more of such films could be provided to reflect substantially all light incident on them (provided they are properly oriented with respect to each other to do so). For example, this construction can be used when optical film 380 with multiple layers is used as a reflector.

In one example, substrate 370 can be a reflective polarizer. A reflective polarizer layer substantially reflects light that has a first polarization state and substantially transmits light that has a second polarization state, where the two polarization states are mutually orthogonal. For example, the average reflectance of a reflective polarizer in the visible for the polarization state that is substantially reflected by the reflective polarizer is at least about 50%, at least about 60%, at least about 70%, at least about 80%, at least about 90%, or at least about 95%. As another example, the average transmittance of a reflective polarizer in the visible for the polarization state that is substantially transmitted by the reflective polarizer is at least about 50%, at least about 60%, at least about 70%, at least about 80%, at least about 90%, at least about 95%, at least about 97%, at least about 98%, or at least about 99%. In some cases, the reflective polarizer substantially reflects light having a first linear polarization state (for example, along the x-direction) and substantially transmits light having a second linear polarization state (for example, along the z-direction).

Any suitable type of reflective polarizer may be used such as, for example, a multilayer optical film (MOF) reflective polarizer such as those available from 3M under the trade designation VIKUITI Dual Brightness Enhancement Film (DBEF), a diffusely reflective polarizing film (DRPF) having a continuous phase and a disperse phase, such as those available from 3M under the trade designation VIKUITI Diffuse Reflective Polarizer Film, a wire grid reflective polarizer, or a cholesteric reflective polarizer.

For example, in some cases, the reflective polarizer layer can be or include an MOF reflective polarizer, formed of alternating layers of different polymer materials, where one of the sets of alternating layers is formed of a birefringent material, where the refractive indices of the different materials are matched for light polarized in one linear polarization state and unmatched for light in the orthogonal linear polarization state. In such cases, an incident light in the matched polarization state is substantially transmitted through the reflective polarizer and an incident light in the unmatched polarization state is substantially reflected by reflective polarizer. In some cases, an MOF reflective polarizer can include a stack of inorganic dielectric layers.

As another example, the reflective polarizer can be or include a partially reflecting layer that has an intermediate on-axis average reflectance in the pass state. For example, the partially reflecting layer can have an on-axis average reflectance of at least about 90% for visible light polarized in a first plane, such as the xy-plane, and an on-axis average reflectance in a range from about 25% to about 90% for visible light polarized in a second plane, such as the xz-plane, perpendicular to the first plane.

In some cases, the reflective polarizer can be or include a circular reflective polarizer, where light circularly polarized in one sense, which may be the clockwise or counterclockwise sense (also referred to as right or left circular polarization), is preferentially transmitted and light polarized in the opposite sense is preferentially reflected. One type of circular polarizer includes a cholesteric liquid crystal polarizer. In some cases, the reflective polarizer can be a multilayer optical film that reflects or transmits light by optical interference.

In one example, the substrate 370 can have a microstructured surface, such as a prismatic light directing film. For example, the porous polymeric film 380 can be coated on the prism side of a light redirecting film such as VIKUITI BEF from 3M. The BEF includes a plurality of linear prisms with, for example, a 24 micron pitch and a prism peak or apex angle of about 90 degrees. The porous polymeric film 380 can be coated on the microstructured surface as a conformal coating, a planarized coating, or pattern coated.

In various embodiments, substantial portions of each two neighboring major surfaces in optical construction 360 are in physical contact with each other along the bottom major surface 384 of the porous polymeric film 380. For example, at least 50%, at least 60%, at least 70%, at least 80%, at least 90%, or at least 95% of the two neighboring major surfaces are in physical contact with each other. For example, in some cases, porous polymeric film 380 is coated directly on substrate 370.

In some embodiments, the major surface 384 of the porous polymeric film 380 overlies an optional layer 386, which may in some cases be an adhesive layer, such as, for example, a pressure sensitive adhesive layer. In some embodiments, the layer 386 may be an optically clear adhesive. In some embodiments, the optional layer 386 may be a tie layer or a primer coating layer that provides compatibility between the porous polymeric film 380 and the substrate 370. In another embodiment, a major surface 382 of the porous polymeric film 380 includes an optional layer 388, which may in some cases be an adhesive layer. In some embodiments, one or both of the adhesive layers 386, 388 can be used to provide a transferable porous polymeric film 380, which may be placed in contact with a substrate or surface.

In some embodiments, one or both of the optional layers 386, 388 may be intervening optical layers between the porous polymeric film 380 and the substrate 370, such that the porous polymeric film 380 does not directly contact the substrate 370. In the present application, the porous polymeric film 380 may be present "on" or "overlying" an underlying layer when the porous polymeric film 380 is in optical communication with the underlying layer, and the porous polymeric film 380 need not directly contact the underlying layer.

Figure 4:
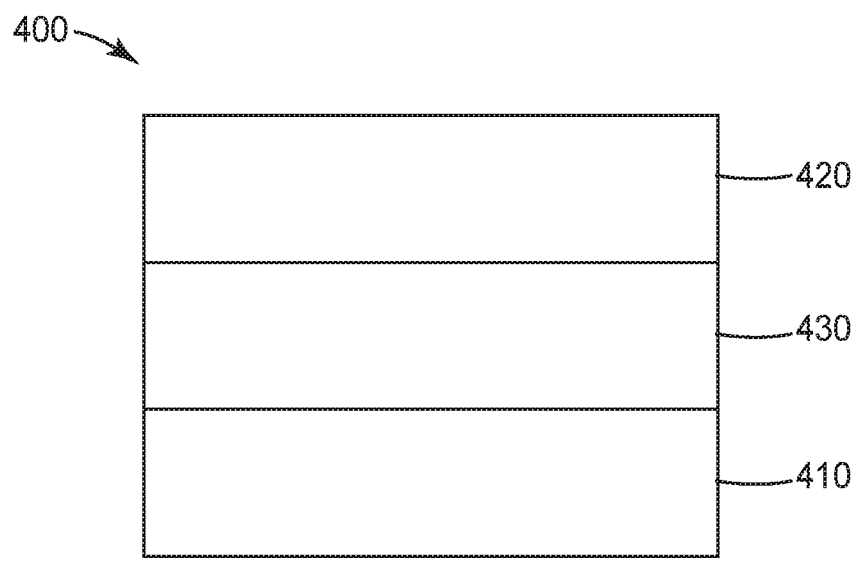
FIG. 4 is a schematic cross-sectional view of an embodiment of an optical construction.

FIG. 4 is a schematic cross-sectional view of an optical construction 400. Optical construction 400 can include a porous polymeric film 430 disposed on a substrate 410 and an optical adhesive layer 420 disposed on the film 430. Substrate 410 can be any of the substrates described elsewhere, including, for example, a substrate such as substrate 370 described with reference to FIG. 3. In some cases, the optical adhesive layer 420 can act as a sealer to inhibit infiltration of voids of the porous polymeric film 430 (similar to seal layer 1206 of FIG. 12A discussed below). In some cases, it may be desirable to have adhesive layer 420 and porous polymeric film 430 on opposite sides of the substrate 410. In other cases, it may be desirable to have the porous polymeric film 430 on both sides of substrate 410.

The optical adhesive layer 420 can be any optical adhesive that may be desirable and/or available in an application, and should be of sufficient optical quality and light stability such that, for example, the adhesive layer does not yellow with time or upon exposure to weather so as to degrade the optical performance of the adhesive and optical film 300. In some cases, the optical adhesive layer 420 can be a substantially clear optical adhesive meaning that the adhesive layer has a high specular transmittance and a low diffuse transmittance. For example, in such cases, the specular transmittance of optical adhesive layer 420 is not less than about 70%, not less than about 80%, not less than about 90%, or not less than about 95%.

Figure 5:
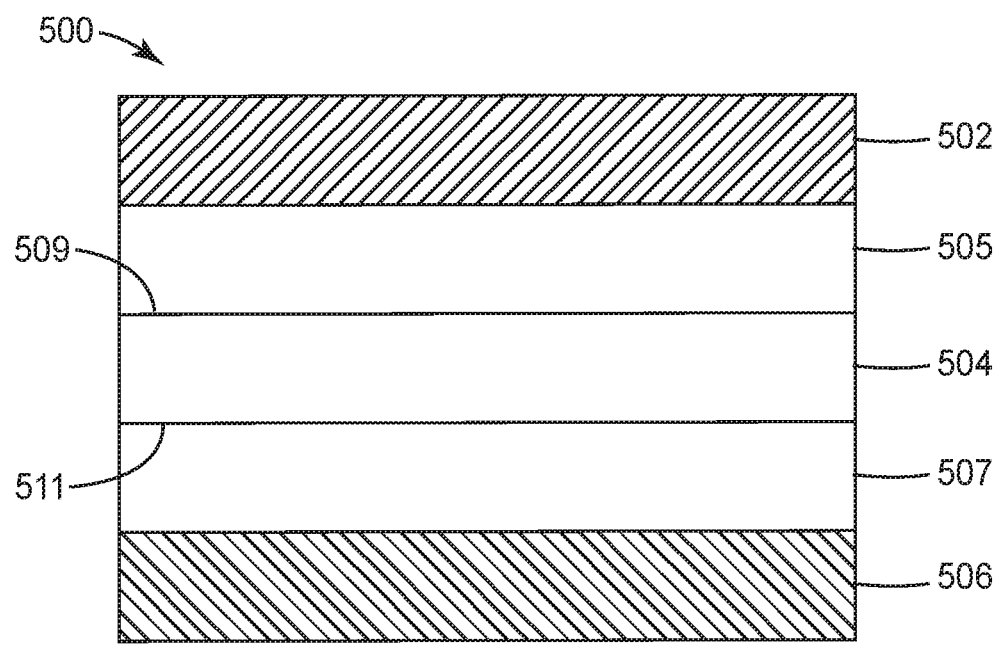
FIG. 5 is a schematic cross-sectional view of an optical stack including a layer of a porous material.

FIG. 5 is a schematic view of a stack 500 of materials that schematically illustrates various embodiments of optical film constructions in which the porous polymeric films of FIGS. 2A-2G, and optical film constructions of FIGS. 3-4, can be used as fluid sensors, optical switches, and the like. The stack 500 includes a first layer 502, a porous polymeric film 504 such as described above, and a second layer 506. The appearance of the stack 500 can change based on the diffusive properties of the porous polymeric film 504. In some embodiments, an optical absorber can be placed in the porous polymeric film 504, in a fluid that fills the porous polymeric film 504, in a surface layer on (or proximate) either surface of porous polymeric film 504, or in the fluid being monitored by the stack 500.

In some embodiments, a selected portion of the porous polymeric film can be filled with a filler material, while leaving other portions of the film remain unfilled and available for fluid sensing. Many different filling patterns are possible. For example, in one embodiment that is not intended to be limiting, first region can be filled with a filler material, leaving an open second region of unfilled porous material therebetween. When the porous polymeric film is used for fluid sensing, a fluid sensing region is confined to the open second region, which can be positioned around or between the first regions of the filler material. In various embodiments, which are not intended to be limiting, the filler material in first regions of the porous polymeric film can be clear, colored, black or white.

The first layer 502 and the second layer 506 on the opposed first and second major surfaces of the optical film 504 can be made of the same or different materials, as illustrated in more detail below. In some embodiments, which are not intended to be limiting, the layers 502, 506 are polymeric films. The layers of the stack 500 can be in optical communication but do not need to be in direct physical contact. In some examples, intervening layers 505, 507 can reside between layers of stack 500, which can be the same or different. The intervening layers 505, 507 can vary widely, and some examples include, but not limited to, polymeric films, glass, adhesives, tie or primer layers, air, and the like. In some embodiments, spaces between the layers of the stack 500 can enable ingress or egress of liquid from the stack 500, or can provide a desired optical effect. In some examples, layers of the stack 500, including first layer 502, optical film 504, and second layer 506, can directly contact each other such that the first layer 502 resides on a first major surface 509 of the optical film 504 and the second layer 506 resides on a second major surface 511 of the optical film 504.

In one embodiment, the first layer 502 is transparent or translucent, and the second layer 506 is pigmented. If the stack 500 is viewed through the first layer 502, and fluid is present is present in the porous polymeric film layer 504, the porous polymeric film layer appears transparent or translucent, and the stack 500 appears to an observer to have the pigmented color of the second layer 506. When the fluid is absent from the optical layer 504, the porous polymeric film 504 is opaque, and the stack 500 appears white to the observer viewing the stack through the first layer 502. This change of appearance can be configured for the entire stack 500, or for selected subregions thereof.

In another embodiment, the first layer 502 is a first pigmented color, and the second layer 506 is a second pigmented color different from the first pigmented color, or a dyed color different from the first pigmented color. When the stack 500 is viewed through first layer 502, if fluid is present is present in the porous polymeric film layer 504, the porous polymeric film 504 is substantially transparent or translucent, and the stack 500 appears to take on the combination of the first and the second colors from the first layer 502 and the second layer 506. When the fluid is absent from the porous polymeric film 504, the porous polymeric film 504 is substantially opaque, and the stack 500 appears to an observer to have the color of the first layer 502.

In other embodiments, the first layer 502 can be an interference reflector such as, for example, a multilayered polymeric film, and the second layer 506 can be omitted. In another example, the first layer 502 can be a first interference reflector and the second layer 506 can be a second interference reflector different from the first interference reflector. Suitable interference reflectors include, but are not limited to, multilayered polymeric films, inorganic multilayer films, and organic/inorganic hybrid multilayer films.

In another embodiment, the first layer 502 can include a frequency down-converting material, and the second layer 506 can be dyed, pigmented, or be an interference reflector. Suitable down-converting materials are capable of absorbing light and reemitting a longer wavelength light, and exemplary down converting materials include, but are not limited to, phosphors, material layers including fluorescing materials or chemistries, quantum dots, and the like.

In another embodiment, either or both of the first layer 502 and the second layer 506 may include an indicia alone or in combination with the pigments and dyes described above. Suitable indicia include, but are not limited to, text, machine readable codes such as bar codes and QR codes, symbols, colors, a selected wavelength, and combinations thereof. For example, if the first layer 502 is transparent or translucent, the second layer 506 may include an indicia. If the stack 500 is viewed through the first layer 502, and fluid is present in the porous polymeric film layer 504, the layer 504 appears transparent or translucent, and the indicia in the second layer 506 is visible or otherwise detectable with an appropriate detector. When the fluid is absent from the porous polymeric layer 504, the layer 504 is opaque, the stack 500 appears white, and the indicia is not visible or detectable. The stack 500 can be configured to show this change of appearance in its entirety, or in one or more selected subregions thereof.

In another embodiment, a surface underlying the optical stack can include a colored region, an indicia, or a combination thereof. The presence or absence of fluid in the porous polymeric film layer can cause the optical stack 500 to be transmissive, revealing to an observer the underlying color or indicia, or opaque, obscuring the underlying color or indicia. The optical stack 500 can be configured to show this change of appearance in its entirety, or in one or more selected subregions thereof.

In some embodiments, the fluid sensing porous layers described herein can be applied as a layer to a surface, or provided in the form of a film that is bonded to a surface, to form a fluid sensor thereon.

For example, in some embodiments the fluid sensors including the porous layers applied on an interior of a closure device including a liquid. The porous layers of the fluid sensors may be used to provide a rapid visual indication of the presence or absence of a fluid in the closure device. The closure device may be removably attached to a wide variety of articles such as, for example, a medical device, a packaging device, and the like.

Figure 6D:
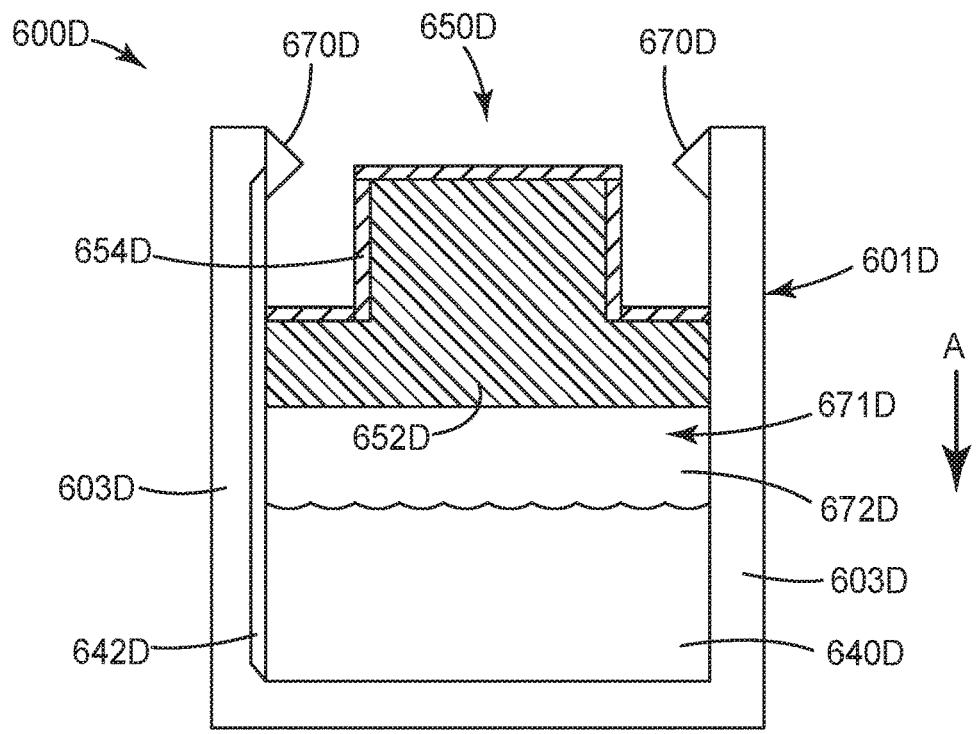
FIG. 6D is a schematic cross-sectional view of an embodiment of a closure member including a plunger with a fluid sensor with a layer of a porous material.

In one embodiment, the porous layers are applied on an interior surface of the closure device, as shown in FIGS. 6A-C. Any of the closure devices shown in FIGS. 6A-C may further include an attachment means such as, for example, threads, or a snap-on mechanism for attaching the closure device to an article. These attachments mechanisms are omitted from FIGS. 6A-E for clarity.

The closure devices 600A-C include a body 601A-C with a fluid sensor 602A-C disposed on at least a portion of a respective interior surface 610A-C thereof. In some embodiments, the body 601A-C may be a polymeric material or glass that is transparent or translucent to at least one wavelength of visible light. The fluid sensors 602A-C may include a single layer of the porous material described in FIG. 2, or a stack of layers including a layer of the porous material (FIGS. 3-5). When viewed through the transparent or translucent body 601A-C, a change in the appearance of the fluid sensor 602A-C can provide a visual indication of the presence or absence of a fluid within the closure member 600A-C.

Referring to FIG. 6A, in one embodiment the closure member 600A includes a transparent, translucent, or opaque body 601A that includes an interior chamber 607A with an interior surface 610A. A fluid sensor 602A is present on the interior surface 610A at an end portion 603A of the body 601A. The fluid sensor 602A includes an open region 605 such that the fluid sensor 602A has a ring-like shape.

The closure device 600A further includes a vent 632A that provides an open path from the fluid sensor 602A to an exterior of the body 601A. If the fluid sensor 602A contacts a fluid, as the fluid evaporates to atmosphere via the vent 632A, the appearance of the optical fluid sensor 602A changes in a manner that is detectable to an observer when the fluid sensor 602A is viewed through the body 601A or through the open interior chamber 607A. All or a portion of the closure device 600A can be transmissive to visible light, and the visible light transmissive regions allow optical inspection (visual or by machine) of the fluid sensor 602A.

In some embodiments, the closure member 600A includes an optional sealing member such as, for example, a foil packaging layer 630A, which prevents evaporation of the fluid from the closure member 600A prior to use. For example, the foil packaging layer 630A can be adhered to the body 601A with a layer of an adhesive (not shown in FIG. 6A), and can be peeled away from the body 601A when the closure member 600A is ready for use.

In another example shown in FIG. 6B, a closure member 600B includes a fluid sensor 602B that completely covers or substantially covers an interior surface 610B of an end portion 603B of the transparent or translucent body 601B. The closure device 600B further includes a vent 632B that provides an open path from the fluid sensor 602B to an exterior of the body 601B. If the fluid sensor 602B contacts a fluid, as the fluid evaporates to the atmosphere via the vent 632B, the appearance of the optical fluid sensor 602B changes in a manner that is detectable to an observer when the fluid sensor 602B is viewed through the body 601B or through the open interior chamber 607B. All or a portion of the closure device 600B can be transmissive to visible light, and the visible light transmissive regions allow optical inspection (visual or by machine) of the fluid sensor stacks 602A.

In some embodiments, the closure member 600B includes an optional sealing member such as, for example, a foil packaging layer 630B, which prevents evaporation of the fluid from the closure member 600B prior to use.

In another example shown in FIG. 6C, a closure member 600C includes a transparent or translucent body 601C in which a fluid sensor 602C completely covers or substantially covers an interior surface 610C of an end portion 603C, as well as a side portion 612C of the body 601C. The embodiment of FIG. 6C does not include a vent, as a threaded closure member in itself is inherently self-vented, because it is difficult to maintain a permanent liquid-tight seal between the closure member and a medical device on which the closure member is applied.

In another embodiments, the fluid sensor is not on the body of the closure member, but is on a component inside the closure member.

For example, in an embodiment shown in FIG. 6D, a closure member 600D includes a body 601D with walls 603D. The walls 603D include an attachment mechanism 670D such as for example, an arrangement of threads or a snap-on ring, for attaching the body 601D to an article. The walls 603D further include a vent 642D that allows a fluid 640D within a cavity 672D of the closure device to gradually evaporate.

A plunger 650D is moveable within a bore 671D formed by the cavity 672D within the walls 603D of the body 601D. The plunger 650D includes a plunger body 652D that is moveable with the bore 671D. The plunger body 652D has thereon a fluid sensor 654D, which may include, for example, a coating of a porous material described above deposited on the plunger body 652D, or an optical film stack including a layer of the porous materials described above that is adhered to the plunger body 652D. As the plunger 650D moves along the bore 671D in the direction of the arrow A and displaces the fluid 640D, the fluid 640D moves around the plunger 650D and contacts the porous material 654D. A change in the appearance of the porous material 654D can provide a rapid visual indication of the presence or absence of the fluid 640D in the closure device 600D.

For example, if the walls 603D are transmissive to a selected wavelength of light, and the plunger 650D is colored or includes an indicia, the presence or absence of the fluid 640D in the closure device can be monitored by observing the porous material 654D. In one example embodiment, if an observer views the closure device along the direction A, and the fluid 640D is present, the porous material 654D will be transparent or translucent, and the color of the plunger body 652D or the indicia thereon will be readily visible. If the fluid 640D is not present, the porous material 654D will be white or opaque, which will obscure the plunger 652D and any indicia thereon. A change in the appearance of the porous material 654D can provide a rapid visual indication of the presence or absence of the fluid 640D in the closure device 600D, and at an interface between the plunger and a medical device.

Figure 6E:
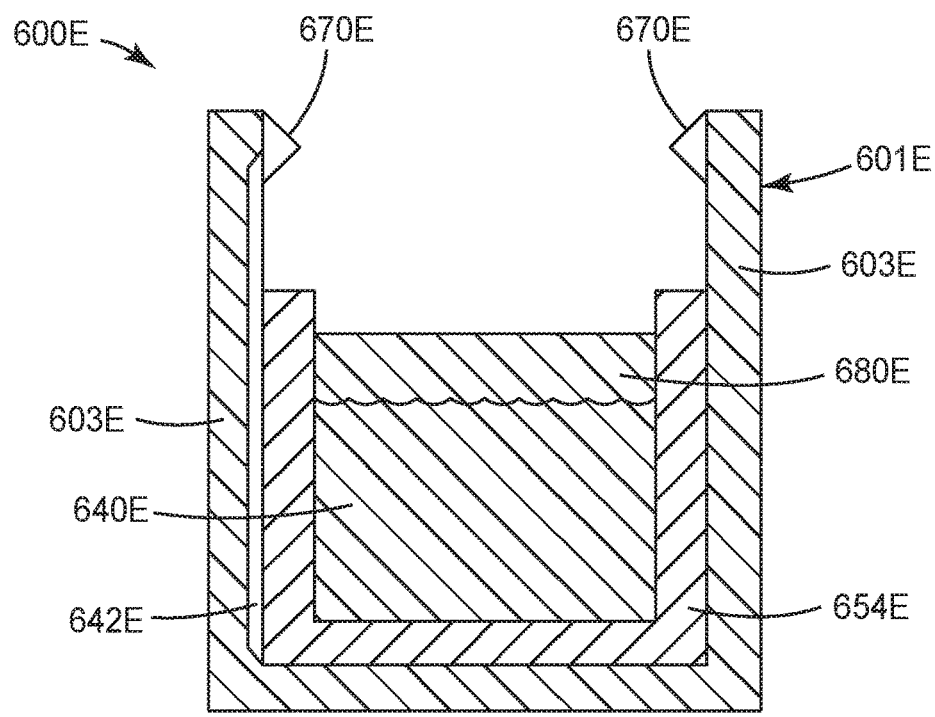
FIG. 6E is a schematic cross-sectional view of an embodiment of a closure member including a liquid reservoir and a fluid sensor with a layer of a porous material.

In another embodiment shown in FIG. 6E, a closure member 600E includes a body 601E with walls 603E. The walls 603E include an attachment mechanism 670E such as for example, an arrangement of threads or a snap-on ring, for attaching the body 601E to an article such as, for example, a medical device. The walls 603E further include a vent 642E that allows a fluid 640E within a fluid reservoir 680E of the closure device to gradually evaporate. In the embodiment of FIG. 6E, the fluid reservoir 680E is an absorbent material such as, for example, a polymeric foam, for retaining the fluid 640E.

The fluid reservoir 680E resides at least partially within a fluid sensor 654E, which is on an interior surface 610E of the walls 603E of the body 601E. In various embodiments, the fluid sensor 654E may include, for example, a coating of a porous material described above deposited on the interior surface 610E, or an optical film stack including a layer of the porous materials described above that is adhered to the interior walls 610E.

As the fluid 640E evaporates via the vent 642E, the fluid 640E is depleted in the fluid reservoir 680E, as well as in the fluid sensor 654E, and the presence or absence of fluid causes a change in the appearance of the fluid sensor 654E, which can provide a rapid visual indication of the presence or absence of the fluid in the closure member 600E.

In one example embodiment, if an observer views the closure device 600E through the walls 603E, which are transparent or translucent to at least one wavelength of light, if fluid is present in the porous material of the fluid sensor 654E, the porous material will be transparent, while the absence of fluid results in a color change of the porous material to white or opaque. In one embodiment, the fluid reservoir 680E may be colored or include an indicia, and the change in appearance of the porous material in the fluid sensor 654E caused by the presence or absence of fluid may reveal the color or indicia.

In some examples, which are not intended to be limiting, the closure devices 600 can be impregnated with an antimicrobial or disinfecting fluid. Suitable antimicrobial fluids include, but not limited to, isopropyl alcohol, ethyl alcohol, chlorhexidine gluconate (CHG), chloroxylenol (PCMX), biguanides such as, for example, polyhexamethylene biguanide (PHMB), bisbiguanides, polymeric biguanides, povidone iodine, hydrogen peroxide, octenidine, benzalkonium chloride, alexidine dihydrochloride, cetyl pyridinium chloride, antimicrobially effective salts thereof, and mixtures and combinations thereof.

In some embodiments, which are not intended to be limiting, the closure devices 600A-E can be applied on a medical device such as, for example, a needleless connector, a stopcock, a male luer of an IV set, a stethoscope, or the like, to provide passive disinfection of the medical device. As the level of the antimicrobial liquid contacting the fluid sensors 602A-E changes, the appearance of the sensors 602A-E changes, which can provide a visual indication of the presence or absence of the disinfecting fluid remaining in the closure member. The change in the appearance of the fluid sensors may be used to alert medical personnel that the closure devices are no longer capable of performing an adequate antimicrobial or disinfecting function, and should be replaced to maintain the sterility of the underlying medical device.

Figure 7:
FIG. 7 is a schematic cross-sectional view of an embodiment of a fluid sensor.

In one embodiment illustrated schematically in FIG. 7, an optical fluid film sensor stack 700 includes a transparent or translucent cover layer 702, a porous layer 704, and a functional layer 706. In various embodiments, the functional layer 706 can be a layer of a foamed material that is capable of absorbing an evaporative fluid, may be a pigmented material, or may include an indicia, or any combination thereof. The optical fluid sensor stack 700 further includes an adhesive layer 708, which in some non-limiting example embodiments is a pressure sensitive adhesive.

The optical fluid sensor stack 700 may be applied on any surface such as, for example, an interior surface of a body of a closure member, or on a plunger, as shown in FIGS. 6A-6E. The optical fluid sensor stack 700 includes a layer 704 of a porous material such as, for example, a porous polymeric film. Depending on the presence of an evaporative liquid in the porous layer 704, the appearance of the optical fluid film sensor stack 700 changes. For example, when the stack 700 is viewed through the first layer 702 and a fluid is present, the porous layer 704 is transparent or translucent, and the stack 700 appears to have the pigmented color of the underlying functional layer 706, or an indicia in the layer 706, or on the body of the closure member to which the stack is attached (or both), is apparent to the observer. When the fluid is absent, the porous layer 704 is opaque, which obscures the layer 706, and the stack appears white. As noted above, this change of appearance can be for the entire stack or a portion thereof, and can provide a rapid visual indication of the presence or absence of fluid remaining the cap. For example, in one embodiment, if the optical fluid sensor stack appears white, an antimicrobial fluid is no longer contacting the porous layer 704, and the closure member may need to be discarded and replaced with a new closure member having an optical stack with a colored appearance.

As will be apparent to one of ordinary skill, the optical fluid film sensor stacks 700 can be disposed on a variety of other enclosures or surfaces to provide a rapid visual indication of the presence or absence of fluid on or within the enclosure. In one example, the optical fluid film sensor stacks 700 can be applied on an interior surface of a food packaging film or food packaging container to provide an indication of moisture intrusion, which may in some cases be indicative of the freshness of the contents thereof. In another example, the optical film stacks could be applied to a surface of a personal care article, a medical article such as a bandage, and the like, to provide an indication of the presence of moisture at the surface.

In another example embodiment, of the optical fluid film sensor stack 700 can be attached to a final product or a subassembly product in a manufacturing process to provide a rapid visual or machine readable indication of the presence or absence of water contamination, or other environmental conditions. In some examples, the change of appearance of the optical fluid film sensor stack 700 could be used as part of a supply chain quality control.

In another example embodiment, one or more components of the optical stack 700 of FIG. 7 can be used as a switchable light extraction layer along an interface between the stack 700 and a surface of an optical component. In one example shown in FIG. 8A, which is not intended to be limiting, a light guide configuration 810 includes a light extraction layer 800A with transparent or translucent light scattering layer 802, and a porous polymeric film layer 804. The light extraction layer 800A is applied on a light guide 812. The configuration 810 further includes a light source 820 that emits light into a surface 821 of the light guide 812. Suitable light sources 820 include light emitting diodes (LEDs), lasers, and the like. In an example embodiment, the light scattering layer 802 can be fluorescent, and the light source 820 can be a light emitting diode (LED), such as a blue LED. The porous polymeric film layer 804 is in optical contact with light guide 812, and in some example embodiments may be attached via a an optically clear adhesive layer (not shown in FIG. 8A).

In FIG. 8A, the porous polymeric film 804 is free or substantially free of liquid. In some examples, the porous polymeric film 804 is a low refractive index material that serves as a cladding on the lightguide 812 and as shown by the arrows 830 can cause light travelling within the lightguide 812 to be total internally reflected along a surface 814 when the porous polymeric film 804 is substantially free of liquid. In the embodiment of FIG. 8A, the porous polymeric film 804 reflects all or substantially all of the light at the surface 814, and light within the lightguide 812 will not be transmitted to the scattering layer 802.

Referring now to FIG. 8B, a light guide configuration 850 includes a light extraction layer 800B with transparent or translucent light scattering layer 852, and a porous polymeric film layer 854. The light extraction layer 800B is applied on a light guide 862. The configuration 850 further includes a light source 870 that emits light into a surface 871 of the light guide 862. The porous polymeric film 854 contains a fluid, which reduces the refractive index of the film 854, and allows light extraction from the surface 864 thereof. As shown by the arrow 880, light within the lightguide 862 is extracted at the surface 864, passes through the porous polymeric film layer 854, which is transparent or translucent, enters the scattering layer 852, and as shown by the arrows 882 can be viewed by an observer. In one example embodiment, if the scattering layer 802 is configured to include a fluorescent material, the lightguide 862 will have a glowing appearance when the porous polymeric film layer 854.

In another embodiment shown in FIG. 9A, a light guide configuration 910 includes a light extraction layer 900A with transparent or translucent light scattering layer 902 on a first major surface 914 of a light guide 912, and a porous polymeric film layer 904 on an opposed second major surface 915 of the light guide 912. The configuration 910 further includes a light source 920 that emits light into a surface 921 of the light guide 912. In one example embodiment, the light scattering layer 902 can include a fluorescent material, and the light source 920 can be a light emitting diode (LED), such as a blue LED.

The scattering layer 902 and the porous polymeric film layer 904 are in optical contact with the first major surface 914 and the second major surface 915 of the light guide 912, respectively, and in some example embodiments may be attached via a layer of an optically clear adhesive (not shown in FIG. 9A). A major surface 917 of the porous optical film layer 904 includes a light absorbing layer 916 thereon.

In FIG. 9A, as shown by the arrows 930, if the porous polymeric film layer 904 is substantially free of fluid, when light is emitted by the light source 920 into the light guide 912, the porous polymeric film layer 904 is substantially opaque. The light 930 is totally reflected within the light guide 912, and enters the scattering layer 902. As shown by the arrows 932, the light traversing the scattering layer 902 will be viewable by an observer, and in embodiments in which the scattering layer includes a fluorescent material, the light guide configuration 910 will appear to glow. The porous polymeric film layer 904 thus isolates any light travelling within the light guide 912 from the light absorbing layer 916, and ensures that the light with the light guide 912 therein will be transmitted to the scattering layer 902.

Referring now to FIG. 9B, a light guide configuration 950 includes a light extraction layer 900B with a transparent or translucent light scattering layer 952 on a first major surface 964 of a light guide 962, and a porous polymeric film layer 954 on an opposed second major surface 965 of the light guide 962. The configuration 950 further includes a light source 970 that emits light into a surface 971 of the light guide 962. In one example embodiment, the light scattering layer 952 can be fluorescent, and the light source 970 can be a light emitting diode (LED), such as a blue LED.

The scattering layer 952 and the porous polymeric film layer 954 are in optical contact with the first major surface 964 and the second major surface 965 of the light guide 962, respectively, and in some example embodiments may be attached via an optically clear adhesive layer (not shown in FIG. 9B). A major surface 967 of the porous optical film layer 954 includes a light absorbing layer 966 thereon.

In FIG. 9B, as shown by the arrow 980, if the porous polymeric film layer 954 is includes a fluid, when light is emitted by the light source 970 into the light guide 962, the porous polymeric film layer 954 is transmissive, and the light 980 exits the light guide 962 at the surface 969 and enters the porous polymeric film layer 954, which allows the light 980 to be absorbed by the light absorbing layer 966. As shown by the arrows 982, the light guide 962 will appear to an observer to be dark.

Figure 10A:
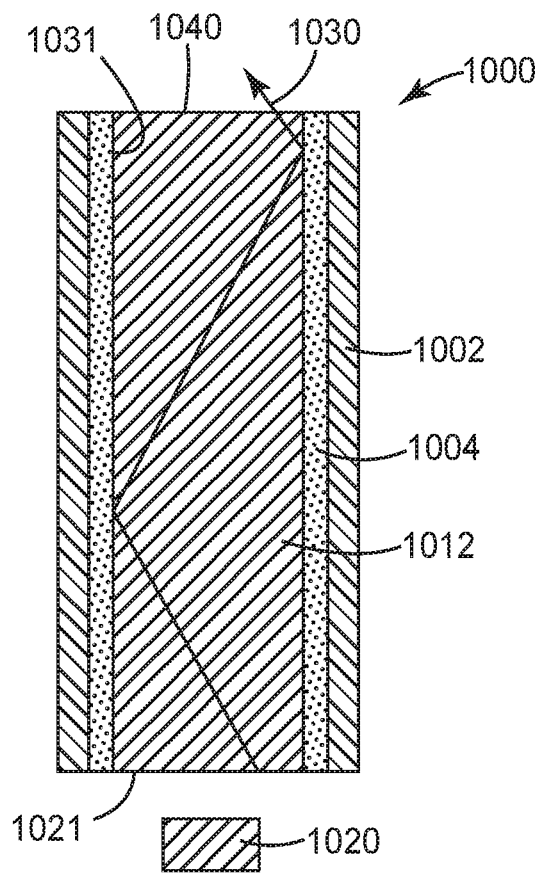
FIG. 10A is a schematic cross-sectional view of an embodiment of a light guide indicator system.
Figure 10B:
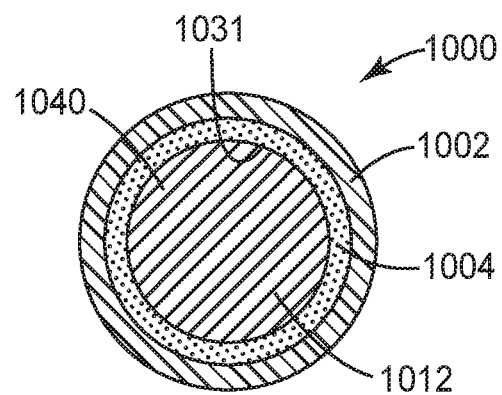
FIG. 10B is a schematic overhead view of a cross section of the light guide indicator of FIG. 10A.

In another embodiment shown schematically in FIGS. 10A and 10B, a light guide indicator system 1000 includes a light absorbing cladding 1002, a porous polymeric film 1004, and a cylindrical light guide 1012. A light source 1020 emits light into a surface 1021 of the light guide 1012. A fluid can be present in voids or voids of the porous polymeric film 1004. In some embodiments, the light source 1020 can be a LED, such as a blue LED.

Figure 11A:
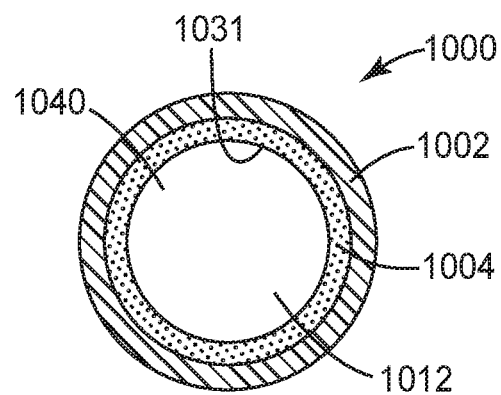
FIGS. 11A-11B are schematic overhead view of a cross section of the light guide indicator of FIG. 10A.
Figure 11B:
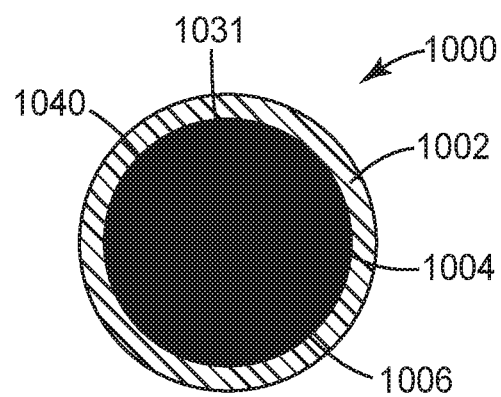

When no fluid is present in the porous polymeric film 1004, the porous polymeric film is mostly air, the light 1030 is totally internally reflected at the walls 1031 of the lightguide 1012, and remains confined within the light guide 1012. The light 1030 ultimately exits the light guide 1012 at a surface 1040 at a distal end thereof relative to the light source 1020. As shown in FIG. 11A, when no fluid is present in the porous polymeric film 1004, the surface 1040 is illuminated and appears bright to an observer.

Though not shown in FIGS. 10A-10B, the surface 1040 can be diffuse, curved, or non-planar. In some embodiments (not shown in FIGS. 10A-10B), the cylindrical light guide 1012 can optionally be used to direct the light 1030 to other locations along the light guide 1012. For example, in some embodiments, one or more portions of the cladding 1002 could be removed so that light exits from the light guide 1012 at specific locations.

When fluid is present in the porous polymeric film 1004, the refractive index of the porous polymeric film changes such that light 1030 traversing the light guide 1012 passes through the walls 1031 of the light guide 1012, enters the porous polymeric film layer 1004, and is absorbed by the light absorbing cladding layer 1002. The surface 1040 distal the light source 1020 thus appears to an observer to be dark.

Figure 12A:
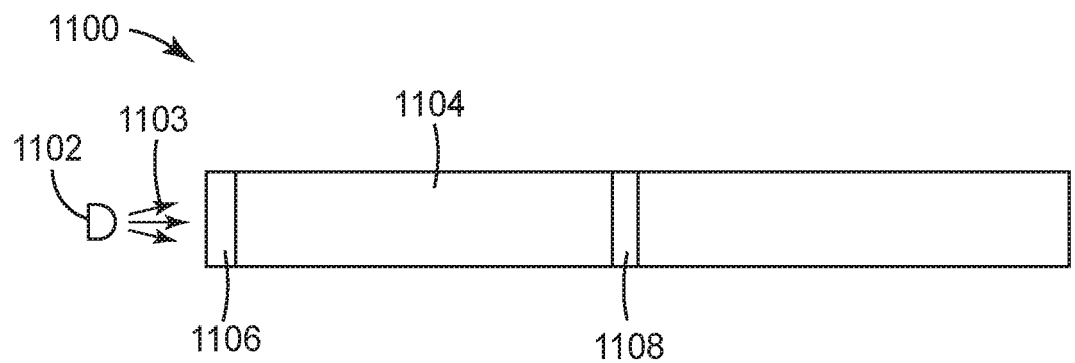
FIG. 12A is a schematic, cross-sectional view of an embodiment of an optical component including a layer of a porous material.

Referring now to FIG. 12A, in another embodiment an optical system 1100 includes a light source 1102 emitting light 1103 into an optical device 1104. In some embodiments, which are not intended to be limiting, the optical device 1104 is a light guide with a rod-like shape or a fiber. Layers 1106, 1108 of a porous material are located along an optical path of the light 1103 traversing the optical device 1104. Depending on the presence or absence of fluid therein, the layer 1106, 1108 change from substantially transparent to hazy, which can impede the amount of light entering or travelling along the optical device 1104. In another example embodiment, the layer 1108 can be a porous adhesive that joins components or sub-units of the optical device 1104.

Figure 12B:
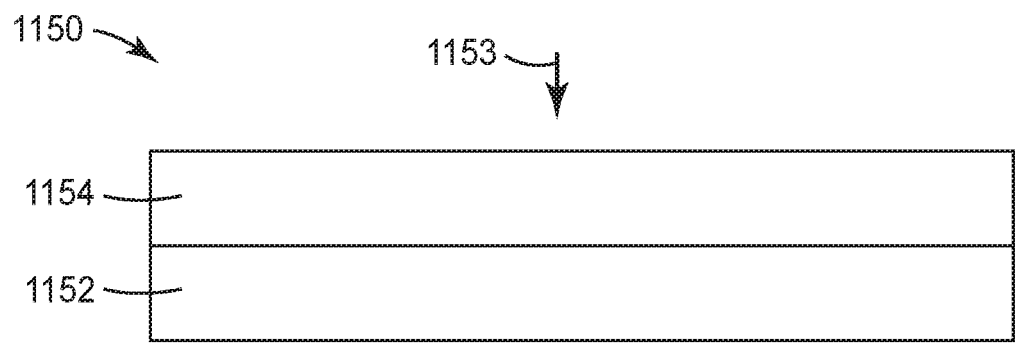
FIG. 12B is a schematic, cross-sectional view of an embodiment of an optical component including a layer of a porous material.

In another embodiment shown in FIG. 12B, an optical device 1150 includes a retroreflector 1152, which is configured to return incoming light 1153 to its source. A layer of a porous material 1154 overlies all or a portion of the retroreflector 1152. Depending on the presence or absence of fluid therein, the porous layer 1154, the appearance of the porous layer changes from substantially transparent to hazy, which can diffuse the retroreflection provided by the layer 1152. The presence of the porous layer 1152 provides a retroreflector that rapidly detects the presence or absence of a fluid, and the detection is readily detectable even at a distance.

Figure 13A:
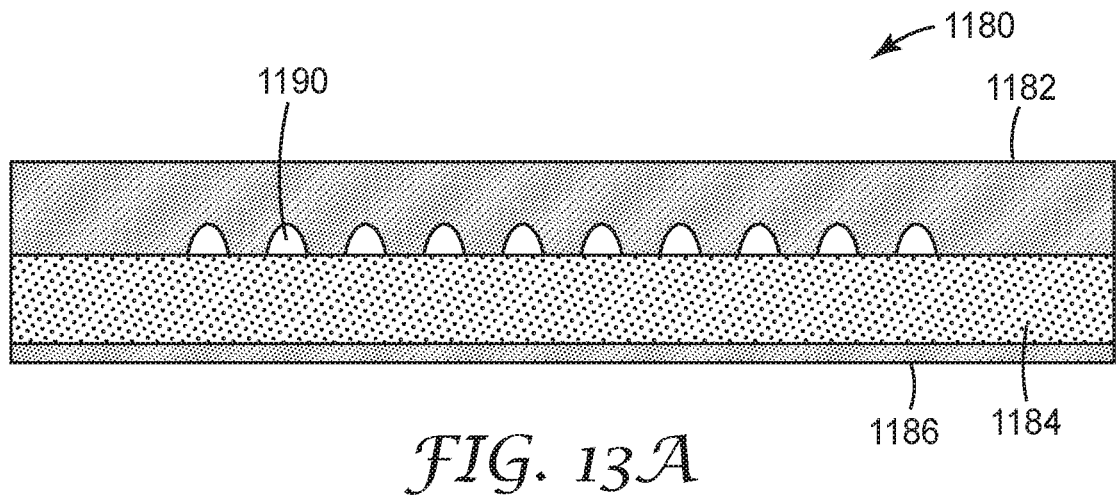
FIG. 13A is a schematic transverse cross-sectional view of an embodiment of a microfluidic device.

Referring now to FIG. 13A, in another embodiment a microfluidic device 1180 includes a microfluidic film 1182 with an arrangement of microchannels 1190 thereon. The device 1180 further includes a porous layer 1184 and a light absorbing seal layer 1186. In the embodiment shown in FIG. 13A, the porous layer 1184 provides a cover that encloses the microfluidic channels 1190.

Figure 13B:
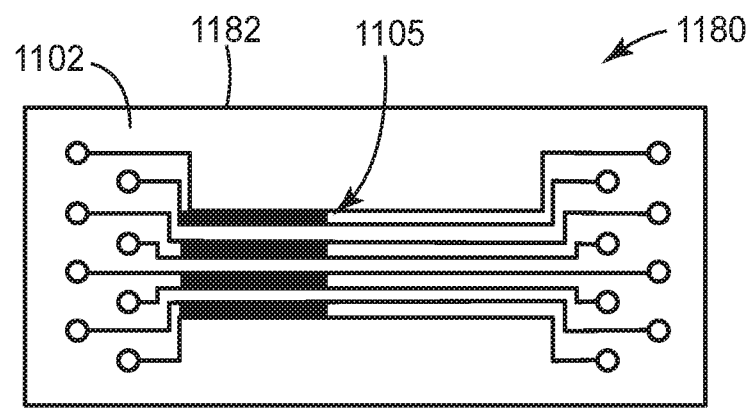
FIG. 13B is a schematic overhead view of the microfluidic device of FIG. 12A.

As a fluid progresses within the microfluidic channels 1190, a portion of the fluid enters the voids of the porous polymeric film 1184 and changes the refractive index thereof, which can in turn change the appearance of the porous layer 1184. As shown in FIG. 13B, the color change in the porous polymeric film 1184 forms a wave front 1195 that provides to an observer a substantially instantaneous visual indication of the movement of the fluid within the microchannels 1190.

Based on the composition of the porous layer 1184, in some embodiments the visual indication can be designed to change appearance after a pre-determined amount of time. In one example, which is not intended to be limiting, a selectively permeable barrier material can be used that slows, but does not prevent the ingress or egress of, a fluid.

Embodiments of the present invention will now be further described with reference to the following non-limiting examples.

EXAMPLES

Example 1

A strip of a porous polymeric film prepared according to the procedures in Example 4 below was coated on an Enhanced Specular Reflector ("ESR") film (available from 3M), and laid flat on a lab bench. The porous polymeric film included a binder, a plurality of particles, and a plurality of interconnected voids. Then 3 drops of isopropyl alcohol (IPA) were deposited on the surface of the porous polymeric film.

As shown in FIGS. 14A-14F, in the time-lapse process 1300 the porous polymeric film 1304 was initially bright white in step 14A, and the IPA 1303 transformed the film to a silver appearance. Within 30 seconds and with the aid of lightly blowing on the surface of the film, as shown in in FIG. 14F the IPA evaporated and the film 1304 returned to its initial white appearance.

Example 2

Figures 15A, 15B, 15C:
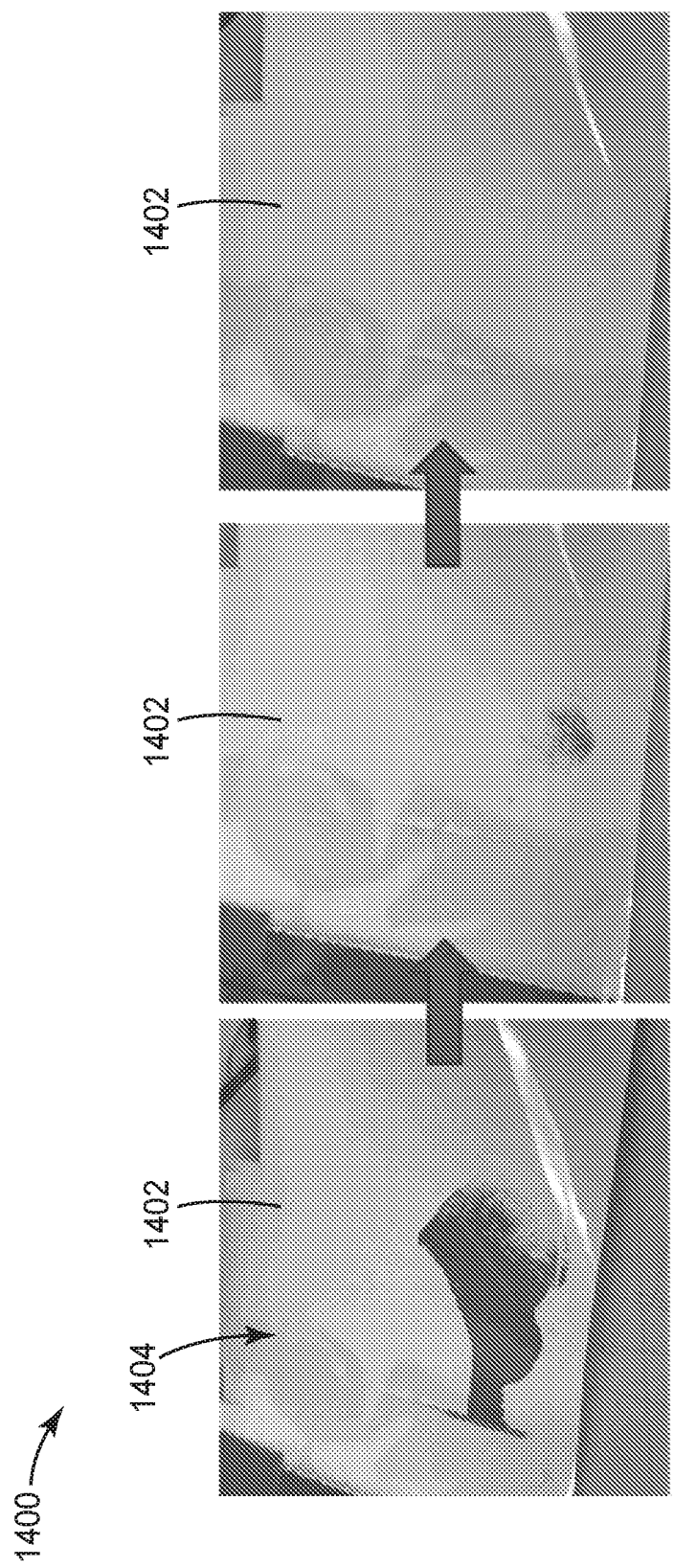
FIGS. 15A-15D are photographs of a fluid deposited on a fluid sensor including a seal layer overlying a porous polymeric film according to Example 2.

Referring to FIGS. 15A-15C, in a time-lapse process 1400, alcohol was applied to the surface of a film construction including a seal layer 1402 overlying a porous polymeric film 1404. The seal coat layer was an acrylic-based RHOPLEX TR-407 (available from The Dow Chemical Company, Midland, Mich.). The RHOPLEX TR-407 was received at 45% solids, and was diluted to 36% solids with deionized water for coating. The target coating thickness was 5 microns dry.

Applying IPA as discussed above in Example 1, the color of the porous polymeric film 1404 did not change for about 15 seconds, then changed color at about 45 seconds as shown in FIG. 15A. FIG. 14B shows porous polymeric film 1404 about 30 seconds after the image of FIG. 15A, which was about 75 seconds after applying IPA to the porous polymeric film 1404. As shown in FIG. 15C, it took about an additional minute after the image of FIG. 15A was captured for the effect to disappear as the IPA evaporated, which was about 105 seconds after applying IPA to the porous polymeric film 1404.

Figure 15D:
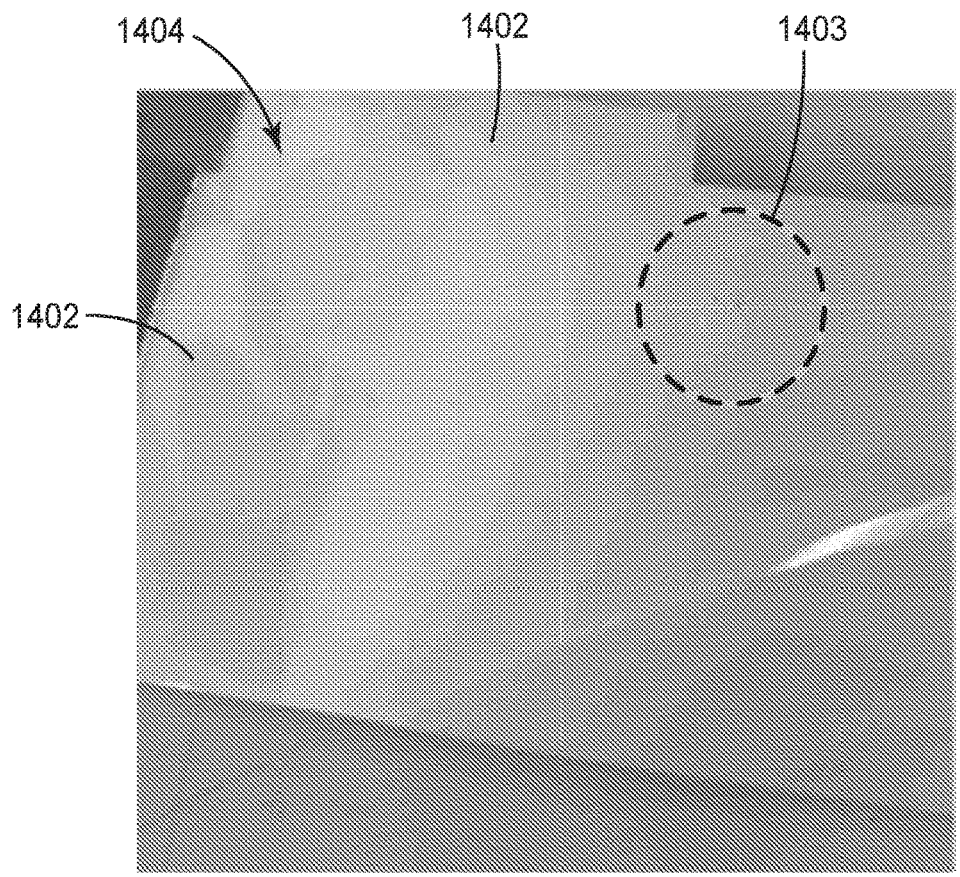

Next, as shown in FIG. 15D, 3 drops of water 1403 were applied to the seal coat surface 1402 overlying the porous polymeric film 1404, which did not change its appearance during a time of 5 minutes, after which the test was stopped.

Example 3

A small strip of the film of Example 1 was placed inside a disinfecting cap for medical syringes and IV tubing available from 3M under the trade designation CUROS. The cap, which was pre-loaded with alcohol, was left open to the atmosphere for 30 minutes so as to allow the alcohol to evaporate. When inserted into the cap, the strip appeared to white.

Next, two drops of IPA were dropped into the cap and the film instantly changed from white to silver. After about 45 seconds, the film returned to its original white appearance.

The results of this example show that the porous optical films of the present disclosure can be used to provide a visual indication of the presence of alcohol in the cap, which can provide medical personnel information about whether the caps retain disinfectant, whether the needle or IV port covered by the caps are sterile, or whether the cap needs to be replaced.

Example 4

A low-haze coating solution "C" was made, which included the components shown in Table 1 below. First, 309 grains of NALCO 2327 (available from Nalco Chemical Company, Naperville, Ill.) (40% wt. solids) and 300 grains of 1-methoxy-2-propanol were mixed together under rapid stirring in a 2-liter three-neck flask that was equipped with a condenser and a thermometer.

Next, 9.5 grams of SILQUEST A-174 and 19.0 grams of SILQUEST A-1230 silica particles (available from Momentive Performance Materials Company, Waterford, N.Y.) were added, and the resulting mixture was stirred for 10 minutes. The mixture was heated at 80° C. for 1 hour using a heating mantle.

Next, an additional 400 grams of 1-methoxy-2-propanol was added. The mixture was kept at 80° C. for 16 hours.

The resulting solution was allowed to cool down to room temperature. Next, most of the water and 1-methoxy-2-propanol solvents (about 700 grams) were removed using a rotary evaporator under a 60 water-bath. The resulting solution was 48.7 wt % A174/A1230 modified 20 nm silica, clear dispersed in 1-methoxy-2-propanol.

Next, 63.4 grams of this solution, 20.5 grains of SR 444 (available from Sartomer Americas, Exton, Pa.), 1.32 grams of the photoinitiator IRGACURE 184 (available from Ciba Specialty Chemicals Inc., Basel, Switzerland), and 87.1 grams of isopropyl alcohol were mixed together by stirring to form the homogenous coating solution "C."

A coating procedure "F" was developed. First, a coating solution was syringe-pumped at a rate of 2.7 cubic centimeters per minute (cc/min) into a 20.3 cm (8-inch) wide slot-type coating die. The slot coating die uniformly distributed a 20.3 cm wide coating onto a substrate moving at 5 feet/minute (152 cm/min).

Next, the coating was polymerized by passing the coated substrate through a UV-LED cure chamber that included a quartz window to allow passage of UV radiation. The UV-LED bank included a rectangular array of 352 UV- LEDs, 16 down-web by 22 cross-web (approximately covering a 20.3 cm×20.3 cm area). The UV-LEDs were placed on two water-cooled heat sinks. The LEDs (available from Cree, Inc., Durham, N.C.) operated at a nominal wavelength of 395 nm, and were run at 45 volts at 10 amps, resulting in a UV-A dose of 0.108 joules per square cm. The UV-LED array was powered and fan-cooled by a TENMA 72-6910 (42V/1 OA) power supply (available from Tenma, Springboro, Ohio). The UV-LEDs were positioned above the cure chamber quartz window at a distance of approximately 2.54 cm from the substrate. The UV-LED cure chamber was supplied with a flow of nitrogen at a flow rate of 46.7 liters/minute (100 cubic feet per hour) resulting in an oxygen concentration of approximately 150 ppm in the cure chamber.

After being polymerized by the UV-LEDs, the solvent in the cured coating was removed by transporting the coating to a drying oven operating at 150° F. for 2 minutes at a web speed of 5 feet/minute.

Next, the dried coating was post-cured using a Fusion System Model 1300P configured with an H-bulb (available from Fusion UV Systems, Gaithersburg, Md.). The UV Fusion chamber was supplied with a flow of nitrogen that resulted in an oxygen concentration of approximately 50 ppm in the chamber.

This solution was then coated according to Example "F," as described herein, on a 2 thousandth of an inch (mil) (0.051 mm) thick PET substrate, e.g., substrate 370, except that the current to the LEDs was 13 Amps, resulting in a UV-A dose of 0.1352 joules per square cm.

The resulting optical film 1500 (FIG. 16) had a total optical transmittance of about 74.5%, an optical haze of about 55.4%, an optical clarity of about 99.7%, and a thickness of about 7 microns.

Figure 16:
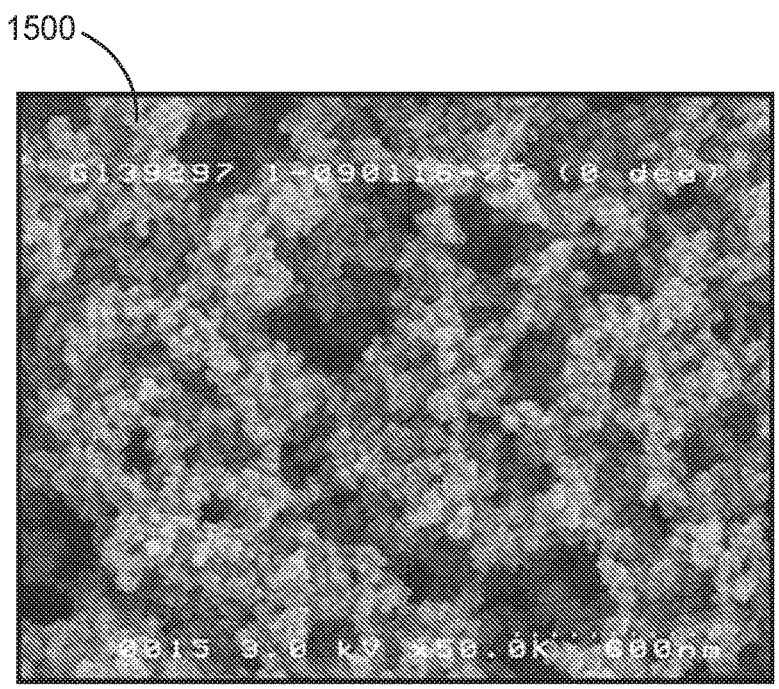
FIG. 16 is a photograph of a cross section of a porous polymeric film.

FIG. 16 is a scanning electron micrograph of a cross-section of a porous polymeric optical film 1500. Particles were coated and interconnected by the binder used to make the porous polymeric film 1500. The interconnected particles formed a network or a scaffold that were dispersed substantially uniformly throughout the film 1500, and the network includes a plurality of interconnected voids with an average size of about 50 nm to about 500 nm, or from about 100 nm to about 300 nm.

Table 1 summarizes a high-Haze optical film coating solution, "Solution H," which was coated at 30.315% solids in a binary mixture of IPA and DOWANOL PM (available from The Dow Chemical Company, Midland, Mich.) with the formulation targets shown in Table 1.

The solvent fractions were 35% DOWANOL PM and 65% IPA, with the properties of the two solvents summarized in Table 1. The nanoparticles were in DOWANOL PM, which is a high boiling solvent. IPA is a relatively poor solvent that helps with gelling, but also contributes to haze. Other formulation targets were a 60:40 ratio of 75 nm silica nanoparticles to resin. The 75 nm nanoparticles were used to enhance the mechanical stability of the gelled coatings. The resin was Sartomer SR444, a trifunctional acrylate.

Two photo initiators were used in the formulation. The IRGACURE 819 absorbs strongly in the 385 nm and 395 nm wavelengths and is used for the gel-curing step. The IRGACURE 184 does not absorb in the 385-395 nm wavelength and absorbs at smaller wavelengths that are matched well with the Fusion H bulb that was used for the final cure.

TABLE 1

Formulation of standard optical film solution H

| Material | Density | High Haze Optical Film Solution H | |
|---|---|---|---|
| | | Solid | Solution |
| NALCO 147 modified 75 nm silica | 2.2000 | 59.113% | 17.976% |
| SR444 | 1.1670 | 39.409% | 11.984% |
| IRGACURE 819 | 1.1900 | 0.985% | 0.300% |
| IRGACURE 184 | 1.1050 | 0.493% | 0.150% |
| 1-methoxy 2 propanol | 0.9190 | — | 24.320% |
| IPA | 0.7854 | — | 45.271% |
| Total | — | 100% | 100% |

Various examples have been described. These and other examples are within the scope of the following claims.

What is claimed is:

1. A fluid sensor comprising a porous layer with a network of a plurality of interconnected voids, wherein the porous layer is optically diffusive to at least one wavelength of light when the network is substantially free of fluid, and wherein the porous layer undergoes a detectable optical change upon fluid ingress into the network or egress from the network, the fluid sensor further comprising a first polymeric film on a first major surface of the porous layer.

2. The fluid sensor of claim 1, wherein at least some of the voids in the porous layer comprise particles therein.

3. The fluid sensor of claim 1, wherein a first local volume fraction of the plurality of interconnected voids proximate a first major surface of the porous layer is greater than a second local volume fraction of the plurality of interconnected voids proximate an opposed second major surface of the porous layer, and wherein the porous layer has a thickness of greater than 2 microns.

4. The fluid sensor of claim 1, wherein the first polymeric film comprises a downconverting material or an interference reflector.

5. The fluid sensor of claim 1, wherein the porous layer is on a surface of a lightguide.

6. The fluid sensor of claim 1, wherein the porous layer is on a substrate, and wherein the substrate comprises an arrangement of fluid channels.

7. The fluid sensor of claim 1, further comprising an evaporative pathway connected to the fluid sensor.

8. The fluid sensor of claim 7, wherein the evaporative pathway comprises a vent.

9. The fluid sensor of claim 1, comprising at least one of a pattern, a symbol, a message, a color, a wavelength, or a machine readable code that becomes visible or detectable when a predetermined amount of the fluid is present in the network.

10. The fluid sensor of claim 1, comprising closure device comprising a body overlain by the fluid sensor forming a fluid chamber.

11. A closure device, comprising:
a body comprising an interior chamber;
a fluid in the interior chamber;
a component in the interior chamber, wherein the component comprises a fluid sensor, the fluid sensor comprising a layer of a porous material with a network of a plurality of interconnected voids;
wherein the fluid sensor undergoes a detectable optical change based on presence of the fluid in the interior chamber; and wherein the layer of the porous material comprises a porous polymeric film, and wherein a first local volume fraction of the plurality of interconnected voids proximate a first major surface of the porous polymeric film is greater than a second local volume fraction of the plurality of interconnected voids proximate an opposed second major surface of the porous polymeric film, and wherein the porous polymeric film comprises a single layer with a thickness of greater than 2 microns.

12. The closure member of claim 11, wherein at least a portion of the body is transmissive to at least one wavelength of light.

13. The closure member of claim 11, wherein the body is a fluid reservoir.

14. The closure member of claim 11, wherein the fluid sensor comprises a first polymeric film on a first major surface of a porous polymeric film, and a second polymeric film, different from the first polymeric film, is on a second major surface of the porous polymeric film, and wherein the first polymeric film is transmissive to visible light and the second polymeric film comprises at least one of a pigment, a dye, an indicia, and combinations thereof.

15. The closure member of claim 14, wherein the first polymeric film comprises at least one of a pigment, a dye, and combinations thereof.

16. The closure member of claim 11, wherein the fluid comprises an antimicrobial liquid chosen from isopropyl alcohol, ethyl alcohol, chlorhexidine gluconate (CHG), chloroxylenol (PCMX), polyhexamethylene biguanide (PHMB), bisbiguanides, polymeric biguanides, povidone iodine, hydrogen peroxide, octenidine, benzalkonium chloride, alexidine dihydrochloride, cetyl pyridinium chloride, antimicrobially effective salts thereof, and mixtures and combinations thereof.

* * * * *